(12) United States Patent
Dou et al.

(10) Patent No.: US 11,349,579 B2
(45) Date of Patent: May 31, 2022

(54) ANTENNA PORT DETERMINING METHOD AND TERMINAL SIDE DEVICE

(71) Applicant: HUAWEI TECHNOLOGIES CO., LTD., Guangdong (CN)

(72) Inventors: Shengyue Dou, Shanghai (CN); Ting Wang, Shanghai (CN); Yuanjie Li, Shanghai (CN); Xiang Ren, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 16/988,123

(22) Filed: Aug. 7, 2020

(65) Prior Publication Data

US 2020/0374017 A1 Nov. 26, 2020

Related U.S. Application Data

(63) Continuation of application No. PCT/CN2019/074060, filed on Jan. 31, 2019.

(30) Foreign Application Priority Data

Feb. 8, 2018 (CN) .......................... 201810130053.3

(51) Int. Cl.
*H04W 24/00* (2009.01)
*H04B 7/02* (2018.01)
(Continued)

(52) U.S. Cl.
CPC ........... *H04B 17/27* (2015.01); *H04B 17/102* (2015.01); *H04J 13/004* (2013.01)

(58) Field of Classification Search
CPC .... H04B 17/27; H04B 17/102; H04B 7/0413; H04B 7/0452; H04J 13/004; H04L 5/0048; H04L 25/0204; H04L 25/0224; H04L 5/0091; H04L 5/0053; H04L 5/0094; H04L 25/0228; H04W 72/042; H04W 72/046
(Continued)

(56) References Cited

U.S. PATENT DOCUMENTS 9,923,684 B2 3/2018 Ng et al.
10,057,839 B2 8/2018 Ng et al.
(Continued)

FOREIGN PATENT DOCUMENTS

| CN | 104919724 A | 9/2015 |
| CN | 105580297 A | 5/2016 |
| WO | 2018021821 A1 | 2/2018 |

OTHER PUBLICATIONS

3GPP TS 36.211 V13.2.0 (Jun. 2016), 3rd Generation Partnership Project; Technical Specification Group Radio Access Network; Evolved Universal Terrestrial Radio Access (E-UTRA); Physical channels and modulation (Release 13), total 168 pages.
(Continued)

*Primary Examiner* — Don N Vo

(57) ABSTRACT

An embodiment of this application provides an antenna port determining method. In a process of determining, based on QCL information and indication information that is used to determine an antenna port number, an antenna port on which downlink data is scheduled, antenna port group information is further introduced, so that the antenna port can be more accurately determined.

20 Claims, 4 Drawing Sheets

(51) Int. Cl.
*H04B 17/27* (2015.01)
*H04B 17/10* (2015.01)
*H04J 13/00* (2011.01)

(58) Field of Classification Search
USPC .......................................................... 375/267
See application file for complete search history.

(56) References Cited

U.S. PATENT DOCUMENTS

| | | | |
|---|---|---|---|
| 10,841,914 B2* | 11/2020 | Liou | ..................... H04L 5/0094 |
| 2014/0192734 A1 | 7/2014 | Ng et al. | |
| 2015/0092768 A1 | 4/2015 | Ng et al. | |
| 2015/0201369 A1 | 7/2015 | Ng et al. | |
| 2015/0249973 A1* | 9/2015 | Park | ........................ H04L 5/001 |
| | | | 370/329 |
| 2018/0368142 A1* | 12/2018 | Liou | ..................... H04W 16/14 |
| 2019/0007897 A1 | 1/2019 | Ng et al. | |
| 2020/0235901 A1* | 7/2020 | Dou | ....................... H04B 7/024 |

OTHER PUBLICATIONS

3GPP TS 38.211 V1.3.0 (Dec. 2017), 3rd Generation Partnership Project; Technical Specification Group Radio Access Network; NR; Physical channels and modulation (Release 15), total 73 pages.

Search Report dated Apr. 19, 2019, issued in PCT/CN2019/074060, total 9 pages.

Huawei, HiSilicon, Signaling of DMRS ports for SU/MU-MIMO. 3GPP TSG RAN WG1 Meeting #90bis, Prague, Czech Republic, Oct. 9-13, 2017, R1-1717310, 15 pages.

Huawei, HiSilicon, Details of QCL assumptions and related RS design considerations. 3GPP TSG RAN WG1 Meeting #88bis, Spokane, USA, 3rd Apr. 7, 2017, R1-1704239, 5 pages.

Samsung, Remaining details on DMRS. 3GPP TSG RAN WG1 Meeting 91, Reno, USA, Nov. 27 Dec. 1, 2017, R1-1720311, 10 pages.

Supplementary European Search Report EP Application No. 19 75 1047 dated Feb. 24, 2021.

* cited by examiner

ANTENNA PORT DETERMINING METHOD AND TERMINAL SIDE DEVICE

CROSS-REFERENCE TO RELATED APPLICATIONS

This application is a continuation of International Application No. PCT/CN2019/074060, filed on Jan. 31, 2019, which claims priority to Chinese Patent Application No. 201810130053.3, filed on Feb. 8, 2018. The disclosures of the aforementioned applications are hereby incorporated by reference in their entireties.

TECHNICAL FIELD

Embodiments of this application relate to the field of wireless communications, and in particular, to an antenna port determining technology.

BACKGROUND

A wireless communications system includes a terminal side device and a network side device that serves the terminal side device. The terminal side device and the network side device have protocol layers that are specified in the 3rd generation partnership project (3GPP) standard and that include a physical (PHY) layer, a media access control (MAC) layer, a radio link control (RLC) layer, a packet data convergence (PDCP) layer, a radio resource control (RRC) layer, and the like. Protocol layers except the physical layer, including the MAC layer, the RLC layer, the PDCP layer, the RRC layer, and the like, are collectively referred to as a higher layer.

To enable the terminal side device to correctly receive downlink data (including downlink service data or downlink control signaling) transmitted in a downlink, the network side device maps, at the physical layer, a demodulation reference signal (DMRS) to at least one antenna port (DMRS antenna port for short), and sends the demodulation reference signal to the terminal side device in the downlink.

The network side device may send downlink control information (DCI) in a specific format to the terminal side device on a physical downlink control channel (PDCCH). The downlink control information includes indication information that can be used to determine antenna port numbers of DMRS antenna ports on which the downlink data is scheduled. The network side device may further indicate, to the terminal side device by using the downlink control information, at least one piece of quasi-colocation (quasi-co-located, QCL) information used when the downlink data is scheduled. Each piece of QCL information indicates that there is a QCL relationship between a DMRS antenna port and another antenna port. The terminal side device may determine the DMRS antenna ports based on the indication information and the QCL information.

In the foregoing implementation process, because there may be a relatively large quantity of candidate antenna ports, the antenna ports may not be accurately determined.

SUMMARY

In view of the foregoing technical problem, a first aspect of embodiments of this application provides an antenna port determining method, where the method is performed by a terminal side device and includes the following content:

receiving downlink control information, where the downlink control information includes quasi co-location QCL information and indication information that is used to determine an antenna port number of a first antenna port on which downlink data is scheduled, and the QCL information indicates that there is a quasi-colocation QCL relationship between the first antenna port and a second antenna port; receiving antenna port group information, where the antenna port group information is used to determine at least one antenna port group, and the at least one antenna port group includes the first antenna port; and determining the first antenna port based on the QCL information, the indication information, and the antenna port group information.

In the technical solution provided in the first aspect, the downlink control information may be carried in a physical layer message, and the antenna port group information may be carried in an RRC layer message. There is at least one piece of the downlink control information. Optionally, the QCL information and the indication information may be carried in same downlink control information. Optionally, the QCL information and the indication information may alternatively be carried in different downlink control information.

By applying the technical solution provided in the first aspect, the antenna port group information is further introduced, so that the terminal side device can search for the required first antenna port based on the antenna port group, and can accurately determine the required antenna port. Further, because the antenna port group information is introduced, a quantity of bits occupied by the indication information in the downlink control information can be correspondingly reduced, thereby reducing signaling overheads in the downlink control information.

According to the first aspect, in a first possible implementation of the first aspect, the indication information is further used to determine at least one of a quantity of code division multiplexing CDM groups corresponding to the first antenna port and a quantity of front-load symbols of the first antenna port for rate matching. In this implementation, same indication information is reused to indicate a plurality of types of information, thereby reducing signaling overheads of the indication information.

According to the first aspect or the first possible implementation of the first aspect, in a second possible implementation of the first aspect, the first antenna port is a demodulation reference signal DMRS antenna port, and the second antenna port is at least one of a channel state information-reference signal CSI-RS antenna port, a synchronization signal block SS block, a phase tracking reference signal PTRS antenna port, and a tracking reference signal TRS antenna port. In this implementation, because the first antenna port and the second antenna port have a QCL relationship, a large-scale property of a channel of the DMRS antenna port may be inferred based on a large-scale property of a channel of the CSI-RS antenna port, a channel of the SS block, a channel of the PTRS antenna port, and a channel of the TRS antenna port, thereby facilitating channel estimation during downlink data transmission on the DMRS antenna port.

According to any one of the first aspect to the second possible implementation of the first aspect, in a third possible implementation of the first aspect, the antenna port group information includes an identifier of at least one code division multiplexing CDM group or at least one DMRS antenna port number, the at least one antenna port group is the at least one DMRS group, and there is a QCL relationship between antenna ports in each of the at least one antenna port group. In this implementation, a specific implementation form that can be used to determine a DMRS antenna port group is listed, and that in this form, there is also a QCL relationship between DMRS antenna ports in the DMRS antenna port group is limited.

According to the third possible implementation of the first aspect, in a fourth possible implementation of the first aspect, there are at least two CDM groups and two DMRS groups, a first DMRS group in the two DMRS groups includes at least one antenna port in at least one of the at least two CDM groups, and a second DMRS group in the two DMRS groups includes at least one antenna port in another CDM group in the two CDM groups. In this implementation, a manner of determining the two DMRS antenna port groups when there are at least two CDM groups is listed.

According to the fourth possible implementation of the first aspect, in a fifth possible implementation of the first aspect, in a case of transmission with one codeword, an absolute value of a difference between a quantity of layers of the at least one antenna port included in the first DMRS group and a quantity of layers of the at least one antenna port included in the second DMRS group is allowed to be greater than 1. In this implementation, in the case of transmission with one codeword, a relationship between quantities of layers of antenna ports included in the two DMRS groups is limited. It should be noted herein that one antenna port corresponds to one layer of MIMO data. Therefore, to indicate this relationship, a person skilled in the art uses the quantity of layers of the at least one antenna port to describe a quantity of the at least one antenna port (that is, the quantity of the at least one antenna port is equal to the quantity of layers of the at least one antenna port). A maximum quantity of layers supported between the terminal side device and the network side device is a rank of a channel matrix obtained through performing channel estimation based on a reference signal.

According to the fourth possible implementation of the first aspect, in a sixth possible implementation of the first aspect, in a case of transmission with two codewords, an absolute value of a difference between a quantity of layers of the at least one antenna port included in the first DMRS group and a quantity of layers of the at least one antenna port included in the second DMRS group is not greater than 1, a first codeword in the two codewords corresponds to the first DMRS group, and a second codeword corresponds to the second DMRS group. In this implementation, in the case of transmission with two codewords, a relationship between quantities of layers of antenna ports included in the two DMRS groups is limited.

A second aspect of the embodiments of this application provides a terminal side device, and the terminal side device includes a receiving unit and a processing unit. The receiving unit is configured to perform a receiving action according to any one of the first aspect to the possible implementations of the first aspect, and the processing unit is configured to perform processing actions such as determining according to any one of the first aspect to the possible implementations of the first aspect. In specific physical implementation, the receiving unit may be a receiving circuit or a receiver, the processing unit may be a processing circuit or a processor, and the sending unit may be a sending circuit or a transmitter. Optionally, the terminal side device may be an independent terminal device, or may be a chip or a circuit system in the terminal device. The chip or the circuit system includes a plurality of gate circuits to implement functions of the foregoing functional units. The terminal side device provided in the second aspect can be used to implement beneficial effects achieved in any one of the first aspect to the possible implementations of the first aspect. Details are not described again.

A third aspect of the embodiments of this application provides a terminal side device, including a processor and a memory, where the memory stores instruction code, and when the code is invoked by the processor, the method according to any one of the first aspect to the possible implementations of the first aspect is implemented. Optionally, the terminal side device provided in the third aspect may be a chip system, or an independent terminal device including the chip system. The terminal side device provided in the third aspect can be used to implement beneficial effects achieved in any one of the first aspect to the possible implementations of the first aspect. Details are not described again.

A fourth aspect of the embodiments of this application provides an antenna port determining method, applied to a network side device, and including the following content:

sending downlink control information, where the downlink control information includes quasi-colocation QCL information and indication information that is used to determine an antenna port number of a first antenna port on which downlink data is scheduled, and the QCL information indicates that there is a QCL relationship between the first antenna port and a second antenna port; and sending antenna port group information, where the antenna port group information is used to determine at least one antenna port group, the at least one antenna port group includes the first antenna port, and the QCL information, the indication information, and the antenna port group information are used by a terminal side device to determine the first antenna port.

In the technical solution provided in the fourth aspect, the downlink control information may be carried in a physical layer message, and the antenna port group information may be carried in an RRC layer message. There is at least one piece of the downlink control information. Optionally, the QCL information and the indication information may be carried in same downlink control information. Optionally, the QCL information and the indication information may alternatively be carried in different downlink control information.

The technical solution provided in the fourth aspect is applied to correspond to the technical solution provided in the first aspect, and has technical effects of the technical solution provided in the first aspect.

According to the fourth aspect, in a first possible implementation of the fourth aspect, before the sending the downlink control information and the antenna port group, the method further includes:

determining the first antenna port, and determining the indication information and the antenna port group information based on the first antenna port.

In the first possible implementation of the fourth aspect, the network side device may determine the indication information and the antenna port group information based on the first antenna port on which the downlink data is scheduled, so that the terminal side device can determine the first antenna port based on the received indication information and the antenna port group information. This ensures consistent understanding of the first antenna port by the network side device and the terminal side device.

According to the fourth aspect or the first possible implementation of the fourth aspect, in a second possible implementation of the fourth aspect, the indication information is further used to determine at least one of a quantity of code division multiplexing CDM groups corresponding to the first antenna port and a quantity of front-load symbols of the first antenna port for rate matching.

According to the technical solution provided in the second possible implementation of the fourth aspect, same indication information is reused to indicate a plurality of types of information, thereby reducing signaling overheads of the indication information.

Optionally, the first antenna port is a demodulation reference signal DMRS antenna port, and the second antenna port is at least one of a channel state information-reference signal CSI-RS antenna port, a synchronization signal block SS block, a phase tracking reference signal PTRS antenna port, and a tracking reference signal TRS antenna port. In this implementation, because the first antenna port and the second antenna port have a QCL relationship, a large-scale property of a channel of the DMRS antenna port may be inferred based on a large-scale property of a channel of the CSI-RS antenna port, a channel of the SS block, a channel of the PTRS antenna port, and a channel of the TRS antenna port, thereby facilitating channel estimation during downlink data transmission on the DMRS antenna port.

Optionally, the antenna port group information includes an identifier of at least one code division multiplexing CDM group or at least one DMRS antenna port number, the at least one antenna port group is the at least one DMRS group, and there is a QCL relationship between antenna ports in each of the at least one antenna port group. In this implementation, a specific implementation form that can be used to determine a DMRS antenna port group is listed, and that in this form, there is also a QCL relationship between DMRS antenna ports in the DMRS antenna port group is limited.

Optionally, there are at least two CDM groups and two DMRS groups, a first DMRS group in the two DMRS groups includes at least one antenna port in at least one of the at least two CDM groups, and a second DMRS group in the two DMRS groups includes at least one antenna port in another CDM group in the two CDM groups. In this implementation, a manner of determining the two DMRS antenna port groups when there are at least two CDM groups is listed.

Optionally, in a case of transmission with one codeword, an absolute value of a difference between a quantity of layers of the at least one antenna port included in the first DMRS group and a quantity of layers of the at least one antenna port included in the second DMRS group is allowed to be greater than 1. In this implementation, in the case of transmission with one codeword, a relationship between quantities of layers of antenna ports included in the two DMRS groups is limited.

Optionally, in a case of transmission with two codewords, an absolute value of a difference between a quantity of layers of the at least one antenna port included in the first DMRS group and a quantity of layers of the at least one antenna port included in the second DMRS group is not greater than 1, a first codeword in the two codewords corresponds to the first DMRS group, and a second codeword corresponds to the second DMRS group. In this implementation, in the case of transmission with one codeword, a relationship between quantities of layers of antenna ports included in the two DMRS groups is limited.

A fifth aspect of the embodiments of this application provides a network side device, and the network side device includes a sending unit and a processing unit. The sending unit is configured to perform a sending action according to any one of the fourth aspect to the possible implementations, and the processing unit is configured to perform processing actions such as determining according to any one of the first aspect to the possible implementations of the first aspect. In specific physical implementation, the processing unit may be a processing circuit or a processor, and the sending unit may be a sending circuit or a transmitter. Optionally, the network side device may be an independent network device (for example, a base station), or may be a chip or a circuit system in the network device. The chip or the circuit system includes a plurality of gate circuits to implement functions of the foregoing functional units. The terminal side device provided in the fifth aspect can be used to implement beneficial effects achieved in any one of the fourth aspect to the possible implementations of the fourth aspect. Details are not described again.

A sixth aspect of the embodiments of this application provides a network side device, including a processor and a memory, where the memory stores instruction code, and when the code is invoked by the processor, the method according to any one of the fourth aspect to the possible implementations is implemented. Optionally, the network side device provided in the sixth aspect may be a chip system, or a network device (such as a base station) including the chip system. The network side device provided in the sixth aspect can be used to implement beneficial effects achieved in any one of the fourth aspect to the possible implementations of the fourth aspect. Details are not described again.

A seventh aspect of this application provides a computer storage medium, where the computer storage medium stores code, and the code is used to implement the method according to any one of the first aspect to the possible implementations of the first aspect, and the fourth aspect to the possible implementations of the fourth aspect. The computer storage medium provided in the seventh aspect may be included in a chip system, or an independent terminal device or network device including the chip system. The computer storage medium provided in the seventh aspect can be used to implement beneficial effects achieved in any one of the first aspect to the possible implementations of the first aspect, and the fourth aspect to the possible implementations of the fourth aspect. Details are not described again.

DESCRIPTION OF EMBODIMENTS

Figure 1:
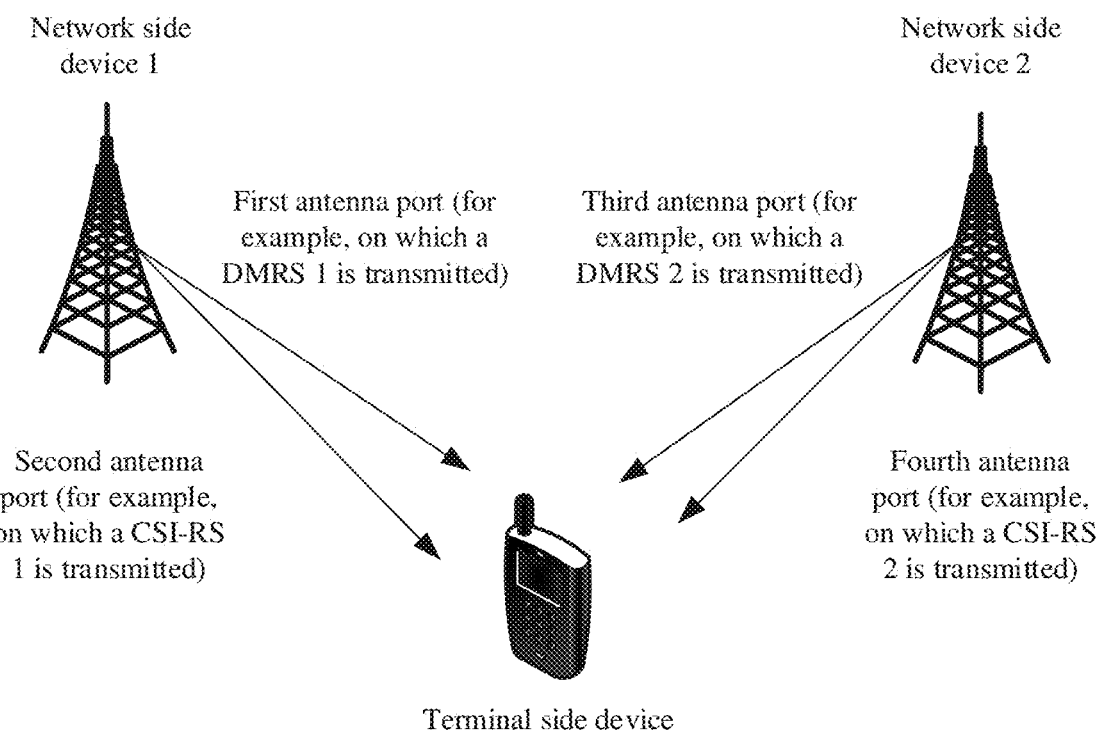
FIG. 1 is a schematic architectural diagram of a wireless communications system according to an embodiment of this application.

A wireless communications system shown in FIG. 1 includes a network side device and a terminal side device.

The network side device may be a base station, for example, an evolved NodeB (evolved node B, eNB) in a long term evolution (LTE) system, a next generation NodeB (next generation node B, gNB) in a new radio (New Radio, NR) system, a wireless local area network access point, or transmission reception points (TRP) such as remote radio units (RRU) in these devices, to provide an access service in a licensed spectrum or an access service in an unlicensed spectrum for the terminal side device. A terminal side device includes user equipment (UE), and is a device providing voice and/or data connectivity for a user, for example, a hand-held device, a vehicle-mounted device, or the like that has a wireless connection function. A common hand-held device includes a mobile phone, a tablet computer, a notebook computer, a palmtop computer, a mobile internet device (MID), or a wearable device such as a smartwatch, a smart band, and a pedometer.

The network side device may be used as an independent device, or may be split into different devices based on protocol layers. For example, after being split based on the protocol layers, the network side device may include one control unit (CU) and at least one distributed unit (DU). The CU is configured to implement functions of the network side device at a PDCP layer, an RRC layer, and protocol layers above the RRC layer, and the DU is configured to implement functions of the network side device at an RLC layer, a MAC layer, and a PHY layer. A person skilled in the art may understand that, in the following implementations, the functions of the network side device at the PDCP layer, the RRC layer, or the protocol layer above the RRC layer may be performed by the CU, and the functions of the network side device at the RLC layer, the MAC layer, or the PHY layer are performed by the at least one DU.

The wireless communications system shown in FIG. 1 may be a wireless communications system such as an NR system (which is also referred to as a 5G system), an LTE system, a long term evolution-advanced (advanced long term evolution, LTE-A) system, or an evolved long term evolution (eLTE) system.

In embodiments of this application, from a perspective of physical implementation, the network side device may be the base station, the wireless local area network access point, or the remote radio unit, or may be a chip or a circuit system in the base station, the wireless local area network access point, or the remote radio unit, and the terminal side device may be the user equipment, or a chip or a circuit system in the user equipment.

In a 5G system, an antenna port is defined to have the following characteristic: On a same antenna port, a channel on which a signal is transmitted may be inferred from a channel on which another signal is transmitted. Therefore, a channel state of a channel (which is alternatively referred to as a channel state of the antenna port) over which data on the antenna port is transmitted on another frequency domain resource or another time domain symbol may be inferred based on a channel over which a reference signal on the antenna port is transmitted on some time domain symbols or some frequency domain resources. Further, to enable the terminal side device to correctly receive data, generally, there is a QCL relationship between a plurality of antenna ports of a same network side device. When a large-scale property of a channel over which a signal on an antenna port is transmitted may be inferred from a channel over which a signal on another antenna port is transmitted, the two antenna ports are defined as ports having the QCL relationship. The large-scale property herein includes at least one of the following properties: a Doppler frequency shift, a Doppler spread, an average delay, a delay spread, and spatial reception. In other words, in a process of obtaining a channel state of an antenna port through performing channel estimation based on a reference signal transmitted on the antenna port, the terminal side device may infer, based on a large-scale property of another antenna port that has the QCL relationship and on which a reference signal is transmitted, a large-scale property of the antenna port on which the reference signal is transmitted, to determine the channel state of the antenna port.

Two or three code division multiplexing (CDM) groups are defined for the 5G system. Each CDM group includes a plurality of DMRS antenna ports that correspond to same time-frequency resources and that can be used to transmit a DMRS in a downlink. The DMRS antenna ports may be distinguished by using different orthogonal codes. The network side device may notify the terminal side device of a quantity of the CDM groups. For example, in a current 5G system, the terminal side device determines the quantity of CDM groups based on a downlink DMRS configuration type (DL-DMRS-config-type) parameter in a received RRC message. When the downlink DMRS configuration type parameter is equal to 1, the quantity of CDM groups is 2. When the downlink DMRS configuration type parameter is equal to 2, the quantity of CDM groups is 3. In the 5G system, there is a QCL relationship between any two DMRS antenna ports in each CDM group. For example, when there are two CDM groups, DMRS antenna ports included in a first CDM group are {1000, 1001, 1004, 1005}, and DMRS antenna ports included in a second CDM group are {1002, 1003, 1006, 1007}. According to the foregoing description of the CDM groups, the DMRS antenna ports {1000, 1001, 1004, 1005} correspond to a group of same time-frequency resources and are distinguished by using different orthogonal codes, and the DMRS antenna ports {1002, 1003, 1006, 1007} correspond to another group of same time-frequency resources and are distinguished by using different orthogonal codes. When there are three CDM groups, DMRS antenna ports included in a first CDM group are {1000, 1001, 1006, 1007}, DMRS antenna ports included in a second CDM group are {1002, 1003, 1008, 1009}, and DMRS antenna ports included in a third CDM group are {1004, 1005, 1010, 1011}.

Further, the 5G system may support two DMRS groups. The first DMRS group includes at least one DMRS antenna port in one of the CDM groups, and the second DMRS group includes at least one DMRS antenna port in another CDM group. When there are two CDM groups, there is one combination of the two DMRS groups: The first DMRS group includes at least one DMRS antenna port in one CDM group, and the DMRS group includes at least one DMRS antenna port in the other CDM group.

When there are three CDM groups, there are six combinations of the two DMRS groups. (1) The first DMRS group includes at least one DMRS antenna port in the first CDM group, and the second DMRS group includes at least one DMRS antenna port in the second CDM group. (2) The first DMRS group includes at least one DMRS antenna port in the first CDM group, and the second DMRS group includes at least one DMRS antenna port in the third CDM group. (3) The first DMRS group includes at least one DMRS antenna port in the second CDM group, and the second DMRS group includes at least one DMRS antenna port in the third CDM group. (4) The first DMRS group includes at least one DMRS antenna port in the first CDM group, and the second DMRS group includes at least one DMRS antenna port in the second CDM group and at least one DMRS antenna port in the third CDM group. (5) The first DMRS group includes at least one DMRS antenna port in the first CDM group and at least one DMRS antenna port in the second CDM group, and the second DMRS group includes at least one DMRS antenna port in the third CDM group. (6) The first DMRS group includes at least one DMRS antenna port in the first CDM group and at least one DMRS antenna port in the third CDM group, and the second DMRS group includes at least one DMRS antenna port in the second CDM group.

In FIG. 1, for example, in non-coherent joint transmission (NCJT) transmission, different network side devices (a network side device 1 and a network side device 2) may send, on same time-frequency resources in a same carrier, data at different multiple-input multiple-output (MIMO) layers to the terminal side device. Data from different network side devices passes through different channels, that is, undergoes different large-scale fading characteristics. Therefore, there is a QCL relationship between a first antenna port (for example, on which a DMRS 1 is transmitted) and a second antenna port (for example, on which a CSI-RS 1 is transmitted) of the network side device 1, there is a QCL relationship between a third antenna port (for example, on which a DMRS 2 is transmitted) and a fourth antenna port (for example, on which a CSI-RS 2 is transmitted) of the network side device 2, and there is no QCL relationship between the antenna ports of the network side device 1 and the antenna ports of the network side device 2. When receiving information (an implicit indication or an explicit indication) used to determine the NCJT transmission, the terminal side device determines that current transmission is the NCJT transmission. The explicit indication directly indicates the NCJT transmission in the information (for example, the information is an identifier of the NCJT transmission). The implicit indication may indicate at least two pieces of QCL information by using a 2-bit PDSCH resource mapping and quasi-colocation indicator (PDSCH RE mapping and quasi-co-location indicator, PQI) in downlink control information in a current 3GPP LTE standard, and 2-bit transmission control indicator (TCI) information in downlink control information in NR, to determine the NCJT transmission. In this case, the terminal side device may receive the data sent from different network side devices on the same time-frequency resources in the same carrier.

In a specific implementation process, a network side device currently accessed by the terminal side device may configure a plurality of pieces of QCL information for the terminal side device by using an RRC layer message. The terminal may determine, based on at least one piece of QCL information that is indicated by downlink control information and that is in the plurality of pieces of QCL information and indication information that is in the downlink control information and that is used to determine an antenna port number (for ease of description, referred to as indication information for short below), an antenna port number of a reference signal antenna port (for example, an antenna port number of a DMRS antenna port) on which downlink data of the downlink control information is scheduled. However, because there may be a very large quantity of antenna ports, there are also a relatively large bit quantity of the indication information that is in the downlink control information and that is used to specifically indicate the antenna port number of the reference signal antenna port on which the downlink data of the downlink control information is scheduled. Consequently, the antenna port may not be accurately determined, and signaling overheads are relatively high.

A first embodiment of this application provides an antenna port determining method. In a case of transmission with one codeword and a case of transmission with two codewords, a port number of an antenna port (such as a DMRS antenna port) in different combination manners of two DMRS groups is determined by using indication information included in downlink control information and at least one piece of QCL information indicated by the downlink control information.

It should be noted that a physical layer of a 5G system supports simultaneous processing of a maximum of two channels of data, and the two channels of data are usually referred to as two codewords.

A first embodiment of this application is applicable to a single-user multiple-input multiple-output (SU-MIMO) scenario, and is further applicable to a two-user multi-user multiple-input multiple-output (MU-MIMO) scenario.

The antenna port determining method provided in the first embodiment of this application includes the following content: A terminal side device receives downlink control information from a network side device, where the downlink control information includes QCL information and indication information that is used to determine an antenna port number of a first antenna port on which downlink data is scheduled, and the QCL information indicates that there is a QCL relationship between a first antenna port and a second antenna port of the network side device. The terminal side device determines the first antenna port in the case of transmission with one codeword or transmission with two codewords based on the indication information and the QCL information.

Optionally, before sending the downlink control information, the network side device may determine the indication information based on the first antenna port on which the downlink data is scheduled.

Optionally, there is at least one piece of the QCL information included in the downlink control information. When there are at least two pieces of QCL information, the terminal side device may determine that current transmission is NCJT transmission. When there is one piece of QCL information, current transmission is not NCJT transmission.

Optionally, the indication information is further used to determine at least one (one, two, or more) of a quantity of front-load symbols of the first antenna port and a quantity of code division multiplexing CDM groups corresponding to the first antenna port for rate matching.

The rate matching means that data bits on a transmission channel between a MAC layer and a PHY layer are repeatedly sent or punctured (that is, repeating and redundant bits are removed), to achieve a required bit rate. The first antenna port corresponds to CDM groups during rate matching. During rate matching, the scheduled downlink data is not mapped to a resource location corresponding to an antenna port included in the CDM groups.

The quantity of front-load symbols is a quantity of time domain symbols occupied by one antenna port.

In the embodiments of this application, an example in which the first antenna port is a DMRS antenna port on which the downlink data is scheduled is used for description. In the NCJT transmission mode (for example, when the downlink control information indicates that there are at least two pieces of QCL information), the first antenna port includes at least one DMRS antenna port in a first DMRS group and at least one DMRS antenna port in a second DMRS group.

Figure 2:
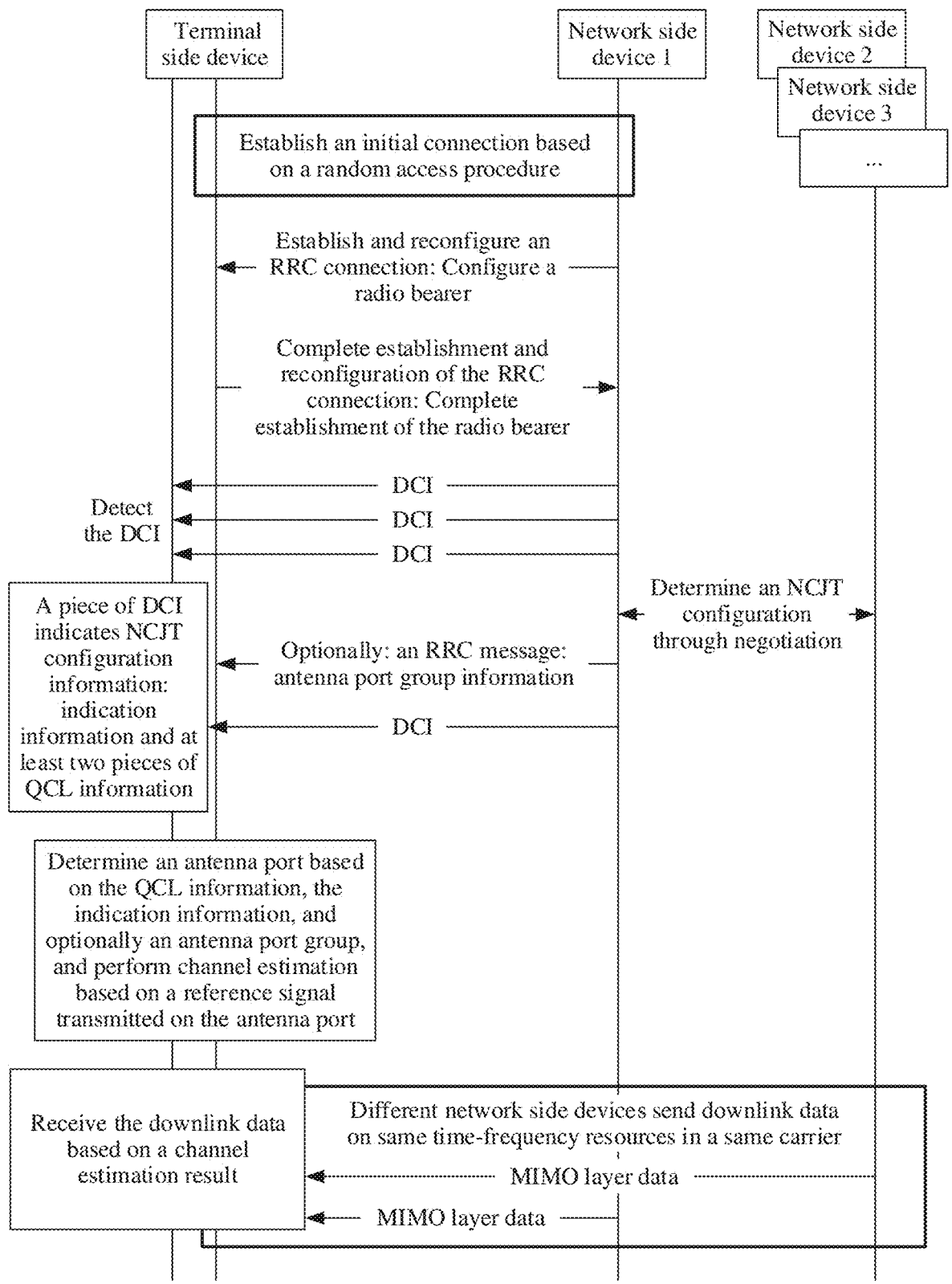
FIG. 2 is a schematic diagram of information exchange in a wireless communications system according to an embodiment of this application.

In an example, FIG. 2 is a schematic diagram of information exchange in a wireless communications system. After the terminal side device establishes an initial connection to a network side device 1 based on a random access procedure, a network side device 1 and the terminal side device may establish a radio bearer (RB) by exchanging an RRC message. When the network side device 1 has downlink data to be sent to the terminal side device, it may be determined whether the network side device 1 and another network side device can perform the NCJT transmission for the terminal side device. If the network side device 1 and the another network side device can perform the NCJT transmission for the terminal side device, the network side device 1 determines a configuration of the NCJT transmission through negotiation with the another network side device, and sends the configuration of the NCJT transmission to the terminal side device by using downlink control information in a specific format. In addition, because the terminal side device detects the downlink control information at regular intervals, the terminal side device learns of a resource location of the scheduled downlink data and other possible configurations. In a detection, the terminal side device detects the configuration of the NCJT transmission in the downlink control information in the specific format (for example, TCI in the downlink control information includes at least two pieces of QCL information, and the downlink control information includes indication information used to determine antenna port numbers of DMRS antenna ports on which the downlink data is scheduled). The terminal side device determines, based on the QCL information and the indication information, antenna port numbers of the DMRS antenna ports on which the downlink data is scheduled. Further, the terminal side device receives a DMRS on the DMRS antenna ports corresponding to the DMRS antenna port numbers, performs channel estimation based on the DMRS, and receives the downlink data based on a channel estimation result.

The following specifically describes how the terminal side device determines, in the NCJT transmission mode by using table lookup, the DMRS antenna ports on which the downlink data is scheduled. In addition, to more accurately determine the DMRS antenna ports on which the downlink data is scheduled, the terminal side device further receives a downlink DMRS configuration type parameter and a downlink DMRS maximum length parameter from the network side device. For example, the terminal side may obtain the downlink DMRS configuration type parameter and the downlink DMRS maximum length parameter through receiving a higher layer message (such as an RRC message), to determine the required antenna ports.

(1) SU-MIMO Scenario (1-1) The downlink DMRS configuration type parameter is equal to 1 (that is, there are two CDM groups), and there are two DMRS groups. Antenna ports included in a first CDM group in the two CDM groups are {1000, 1001, 1004, 1005}, and antenna ports included in a second CDM group are {1002, 1003, 1006, 1007}. The first DMRS group in the two DMRS groups includes at least one antenna port in the first CDM group, and the second DMRS group includes at least one antenna port in the second CDM group. In the case of transmission with one codeword, an absolute value of a difference between a quantity of layers of each antenna port included in the two DMRS groups is allowed to be greater than 1. In the case of two codewords, an absolute value of a difference between a quantity of layers of each antenna port included in the two DMRS groups is not greater than 1, a first codeword in the two codewords corresponds to the first DMRS group, and a second codeword in the two codewords corresponds to the second DMRS group.

(1-1a) If the downlink DMRS configuration type parameter is equal to 1, and the downlink DMRS maximum length parameter received by the terminal side device is equal to 1, the terminal side device determines, based on Table 1, the DMRS antenna ports on which the downlink data is scheduled (in this case, transmission with one codeword is supported).

For example, the terminal side device establishes a connection to a network side device, and receives a plurality of pieces of QCL information configured by the network side device based on the RRC message. The terminal side device learns, based on the detected at least two pieces of QCL information (the at least two pieces of QCL information are included in the plurality of pieces of configured QCL information) indicated by the TCI included in the downlink control information, that current transmission is the NCJT transmission. If the RRC message received by the terminal side device further indicates that the downlink DMRS configuration type parameter is equal to 1, and that the downlink DMRS maximum length parameter is equal to 1, the terminal side device uses Table 1.

Then, the terminal side device may learn, from Table 1 based on a value 3 of the indication information that is used to determine the antenna port numbers and that is in the downlink control information, that the DMRS antenna ports are the port 1000 in the first DMRS group and the ports 1002, 1003, and 1006 in the second DMRS group.

(1-1b) If the downlink DMRS configuration type parameter is equal to 1, and the downlink DMRS maximum length parameter received by the terminal side device is equal to 2, the terminal side device determines, based on Table 2, the DMRS antenna ports on which the downlink data is scheduled.

For example, the terminal side device establishes a connection to a network side device, and receives a plurality of pieces of QCL information configured by the network side device based on the RRC message. The terminal side device learns, based on the detected at least two pieces of QCL information (the at least two pieces of QCL information are included in the plurality of pieces of configured QCL information) indicated by the TCI included in the downlink control information, that current transmission is the NCJT transmission. If the RRC message received by the terminal side device further indicates that the downlink DMRS configuration type parameter is equal to 1, and that the downlink DMRS maximum length parameter is equal to 2, the terminal side device uses Table 2.

Then, the terminal side device may learn, from Table 2 based on a value 0 of the indication information in the downlink control information, that in the case of transmission with one codeword, DMRS antenna ports on which a DMRS is currently transmitted are the port 0 in the first DMRS group and the port 1002 in the second DMRS group, and in the case of transmission with two codewords, DMRS antenna ports on which a DMRS is currently transmitted are the ports 1000 and 1001 in the first DMRS group and the ports 1002, 1003, and 1006 in the second DMRS group.

TABLE 1

DMRS antenna port (1000 + a DMRS port number), a downlink
DMRS configuration type (DL-DMRS-config-type) = 1,
and a downlink DMRS maximum length (DL-DMRS-max-len) = 1
One codeword:
Codeword 0 is enabled (enabled)
Codeword 1 is disabled (disabled)

| Indication information (value) in downlink control information | Quantity of code division multiplexing CDM groups during rate matching (Number of DMRS CDM group(s) without data) | DMRS port number (DMRS ports) |
|---|---|---|
| 0 | 2 | 0; 2 |
| 1 | 2 | 0; 2, 3 |
| 2 | 2 | 0, 1; 2 |
| 3 | 2 | 0; 2, 3, 6 |
| 4 | 2 | 0, 1; 2, 3 |
| 5 | 2 | 0, 1, 4; 2 |
| 6 | Reserved | Reserved |

TABLE 2

Antenna port (1000 + a DMRS port number), a downlink DMRS configuration type parameter
(DL-DMRS-config-type) = 1, and a downlink DMRS maximum length (DL-DMRS-max-len) = 2

| | One codeword: Codeword 0 is enabled Codeword 1 is disabled | | | | Two codewords: Codeword 0 is enabled Codeword 1 is enabled | | |
|---|---|---|---|---|---|---|---|
| Indication information (value) in downlink control information | Quantity of code division multiplexing CDM groups during rate matching | DMRS port number | Quantity of front-load symbols (Number of front-load symbols) | Indication information in downlink control information | Quantity of code division multiplexing CDM groups during rate matching | DMRS port number | Quantity of front-load symbols |
| 0 | 2 | 0; 2 | 1 | 0 | 2 | 0, 1; 2, 3, 6 | 2 |
| 1 | 2 | 0; 2, 3 | 1 | 1 | 2 | 0, 1, 4; 2, 3 | 2 |
| 2 | 2 | 0, 1; 2 | 1 | 2 | 2 | 0, 1, 4; 2, 3, 6 | 2 |
| 3 | 2 | 0; 2, 3, 6 | 1 | 3 | 2 | 0, 1, 4; 2, 3, 6, 7 | 2 |
| 4 | 2 | 0, 1; 2, 3 | 1 | 4 | 2 | 0, 1, 4, 5; 2, 3, 6 | 2 |
| 5 | 2 | 0, 1, 4; 2 | 1 | 5 | 2 | 0, 1, 4, 5; 2, 3, 6, 7 | 2 |
| 6-7 | Reserved | Reserved | Reserved | 6-7 | Reserved | Reserved | Reserved |

(1-2) The downlink DMRS configuration type parameter is equal to 2 (that is, there are three CDM groups), and there are still two DMRS groups. In this case, antenna ports included in a first CDM group are {1000, 1001, 1006, 1007}, antenna ports included in a second CDM group are {1002, 1003, 1008, 1009}, and antenna ports included in a third CDM group are {1004, 1005, 1010, 1011}. In the case of transmission with one codeword, an absolute value of a difference between a quantity of layers of each antenna port included in the two DMRS groups is allowed to be greater than 1. In the case of two codewords, an absolute value of a difference between a quantity of layers of each antenna port included in the two DMRS groups is not greater than 1.

The two DMRS groups may have six combination manners: The first DMRS group includes at least one antenna port in the first CDM group, and the second DMRS group includes at least one antenna port in the second CDM group; The first DMRS group includes at least one antenna port in the first CDM group, and the second DMRS group includes at least one antenna port in the third CDM group; The first DMRS group includes at least one antenna port in the second CDM group, and the second DMRS group includes at least one antenna port in the third CDM group; The first DMRS group includes at least one antenna port in the first CDM group, and the second DMRS group includes at least one antenna port in the second CDM group and at least one antenna port in the third CDM group; The first DMRS group includes at least one antenna port in the first CDM group and at least one antenna port in the second CDM group, and the second DMRS group includes at least one antenna port in the third CDM group; The first DMRS group includes at least one antenna port in the first CDM group and at least one antenna port in the third CDM group, and the second DMRS group includes at least one antenna port in the second CDM group.

(1-2a) If the downlink DMRS configuration type parameter is equal to 2, and the downlink DMRS maximum length parameter received by the terminal side device is equal to 1, the terminal side device determines, based on Table 3, the DMRS antenna ports on which the downlink data is scheduled.

For example, the terminal side device establishes a connection to a network side device, and receives a plurality of pieces of QCL information configured by the network side device based on the RRC message. The terminal side device learns, based on the detected at least two pieces of QCL information (the at least two pieces of QCL information are included in the plurality of pieces of configured QCL information) indicated by the TCI included in the downlink control information, that current transmission is the NCJT transmission. If the RRC message received by the terminal side device further indicates that the downlink DMRS configuration type parameter is equal to 2, and that the downlink DMRS maximum length parameter is equal to 1, the terminal side device uses Table 3.

Then, the terminal side device may learn, from Table 3 based on a value 3 of the indication information in the downlink control information, that in the case of transmission with one codeword, DMRS antenna ports on which a DMRS is currently transmitted are the port 1000 in the first DMRS group and the ports 1002, 1003, and 1008 in the second DMRS group, and in the case of transmission with two codewords, DMRS antenna ports on which a DMRS is currently transmitted are the ports 1000, 1001, and 1006 in the first DMRS group and the ports 1002, 1003, and 1008 in the second DMRS group.

(1-2b) If the downlink DMRS configuration type parameter is equal to 2, and the downlink DMRS maximum length parameter received by the terminal side device is equal to 2, the terminal side device determines, based on Table 4, the DMRS antenna ports on which a DMRS is currently transmitted.

For example, the terminal side device establishes a connection to a network side device, and receives a plurality of pieces of QCL information configured by the network side device based on the RRC message. The terminal side device learns, based on the detected at least two pieces of QCL information (the at least two pieces of QCL information are included in the plurality of pieces of configured QCL information) indicated by the TCI included in the downlink control information, that current transmission is the NCJT transmission. If the RRC message received by the terminal side device further indicates that the downlink DMRS configuration type parameter is equal to 2, and that the downlink DMRS maximum length parameter is equal to 2, the terminal side device uses Table 4.

Then, the terminal side may learn, from Table 4 based on a value 5 of the indication information in the downlink control information, that in the case of transmission with one codeword, DMRS antenna ports on which a DMRS is currently transmitted are the ports 1000, 1001, and 1006 in the first DMRS group and the port 1002 in the DMRS group, and in the case of transmission with two codewords, DMRS antenna ports on which a DMRS is currently transmitted are the ports 1000, 1001, 1006, and 1007 in the first DMRS group and the ports 1002, 1003, 1008, and 1009 in the second DMRS group.

TABLE 3

Antenna port (1000 + a DMRS port number), a downlink DMRS configuration type parameter (DL-DMRS-config-type) = 2, and a downlink DMRS maximum length (DL-DMRS-max-len) = 1

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS antenna port number |
| 0 | 2 | 0; 2 | 0 | 2 | 0, 1; 2, 3, 8 |
| 1 | 2 | 0; 2, 3 | 1 | 2 | 0, 1, 6; 2, 3 |
| 2 | 2 | 0, 1; 2 | 2 | 2 | 0, 1, 6; 2, 3, 8 |
| 3 | 2 | 0; 2, 3, 8 | 3 | 2 | 0, 1, 6; 2, 3, 8, 9 |
| 4 | 2 | 0, 1; 2, 3 | 4 | 2 | 0, 1, 6, 7; 2, 3, 8 |
| 5 | 2 | 0, 1, 6; 2 | 5 | 2 | 0, 1, 6, 7; 2, 3, 8, 9 |
| 6 | 3 | 0; 4 | 6 | 3 | 0, 1; 4, 5, 10 |
| 7 | 3 | 0; 4, 5 | 7 | 3 | 0, 1, 6; 4, 5 |
| 8 | 3 | 0, 1; 4 | 8 | 3 | 0, 1, 6; 4, 5, 10 |
| 9 | 3 | 0; 4, 5, 10 | 9 | 3 | 0, 1, 6; 4, 5, 10, 11 |
| 10 | 3 | 0, 1; 4, 5 | 10 | 3 | 0, 1, 6, 7; 4, 5, 10 |
| 11 | 3 | 0, 1, 6; 4 | 11 | 3 | 0, 1, 6, 7; 4, 5, 10, 11 |
| 12 | 3 | 2; 4 | 12 | 3 | 2, 3; 4, 5, 10 |
| 13 | 3 | 2; 4, 5 | 13 | 3 | 2, 3, 8; 4, 5 |
| 14 | 3 | 2, 3; 4 | 14 | 3 | 2, 3, 8; 4, 5, 10 |
| 15 | 3 | 2; 4, 5, 10 | 15 | 3 | 2, 3, 8, 9; 4, 5, 10 |
| 16 | 3 | 2, 3; 4, 5 | 16 | 3 | 2, 3, 8; 4, 5, 10, 11 |
| 17 | 3 | 2, 3, 8; 4 | 17 | 3 | 2, 3, 8, 9; 4, 5, 10, 11 |
| 18 | 3 | 0; 2 | 18 | 3 | 0, 1; 2, 3, 4 |
| 19 | 3 | 0; 2, 3 | 19 | 3 | 0, 1, 6; 2, 3 |
| 20 | 3 | 0, 1; 2 | 20 | 3 | 0, 1, 6; 2, 3, 4 |
| 21 | 3 | 0; 2, 3, 4 | 21 | 3 | 0, 1, 6; 2, 3, 4, 5 |
| 22 | 3 | 0, 1; 2, 3 | 22 | 3 | 0, 1, 6, 7; 2, 3, 4 |
| 23 | 3 | 0, 1, 6; 2 | 23 | 3 | 0, 1, 6, 7; 2, 3, 4, 5 |

TABLE 3-continued

Antenna port (1000 + a DMRS port number), a downlink DMRS configuration type parameter (DL-DMRS-config-type) = 2, and a downlink DMRS maximum length (DL-DMRS-max-len) = 1

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS antenna port number |
| 24 | 3 | 0; 2 | 24 | 3 | 0, 1; 2, 3, 8 |
| 25 | 3 | 0; 2, 3 | 25 | 3 | 0, 1, 4; 2, 3 |
| 26 | 3 | 0, 1; 2 | 26 | 3 | 0, 1, 4; 2, 3, 8 |
| 27 | 3 | 0; 2, 3, 8 | 27 | 3 | 0, 1, 4; 2, 3, 8, 9 |
| 28 | 3 | 0, 1; 2, 3 | 28 | 3 | 0, 1, 4, 5; 2, 3, 8 |
| 29 | 3 | 0, 1, 4; 2 | 29 | 3 | 0, 1, 4, 5; 2, 3, 8, 9 |
| 30 | 3 | 0; 4 | 30 | 3 | 0, 1; 4, 5, 10 |
| 31 | 3 | 0; 4, 5 | 31 | 3 | 0, 1, 2; 4, 5 |
| 32 | 3 | 0, 1; 4 | 32 | 3 | 0, 1, 2; 4, 5, 10 |
| 33 | 3 | 0; 4, 5, 10 | 33 | 3 | 0, 1, 2; 4, 5, 10, 11 |
| 34 | 3 | 0, 1; 4, 5 | 34 | 3 | 0, 1, 2, 3; 4, 5, 10 |
| 35 | 3 | 0, 1, 2; 4 | 35 | 3 | 0, 1, 2, 3; 4, 5, 10, 11 |
| 36-63 | Reserved | Reserved | 36-63 | Reserved | Reserved |

TABLE 4

Antenna port (1000 + a DMRS port number), a downlink DMRS configuration type parameter (DL-DMRS-config-type) = 2, and a downlink DMRS maximum length (DL-DMRS-max-len) = 2

| One codeword: Codeword 0 is enabled Codeword 1 is disabled | | | | Two codewords: Codeword 0 is enabled Codeword 1 is enabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 2 | 0; 2 | 1 | 0 | 2 | 0, 1; 2, 3, 8 | 2 |
| 1 | 2 | 0; 2, 3 | 1 | 1 | 2 | 0, 1, 6; 2, 3 | 2 |
| 2 | 2 | 0, 1; 2 | 1 | 2 | 2 | 0, 1, 6; 2, 3, 8 | 2 |
| 3 | 2 | 0; 2, 3, 8 | 1 | 3 | 2 | 0, 1, 6; 2, 3, 8, 9 | 2 |
| 4 | 2 | 0, 1; 2, 3 | 1 | 4 | 2 | 0, 1, 6, 7; 2, 3, 8 | 2 |
| 5 | 2 | 0, 1, 6; 2 | 1 | 5 | 2 | 0, 1, 6, 7; 2, 3, 8, 9 | 2 |
| 6 | 3 | 0; 4 | 1 | 6 | 3 | 0, 1; 4, 5, 10 | 2 |
| 7 | 3 | 0; 4, 5 | 1 | 7 | 3 | 0, 1, 6; 4, 5 | 2 |
| 8 | 3 | 0, 1; 4 | 1 | 8 | 3 | 0, 1, 6; 4, 5, 10 | 2 |
| 9 | 3 | 0; 4, 5, 10 | 1 | 9 | 3 | 0, 1, 6; 4, 5, 10, 11 | 2 |
| 10 | 3 | 0, 1; 4, 5 | 1 | 10 | 3 | 0, 1, 6, 7; 4, 5, 10 | 2 |
| 11 | 3 | 0, 1, 6; 4 | 1 | 11 | 3 | 0, 1, 6, 7; 4, 5, 10, 11 | 2 |
| 12 | 3 | 2; 4 | 1 | 12 | 3 | 2, 3; 4, 5, 10 | 2 |
| 13 | 3 | 2; 4, 5 | 1 | 13 | 3 | 2, 3, 8; 4, 5 | 2 |
| 14 | 3 | 2, 3; 4 | 1 | 14 | 3 | 2, 3, 8; 4, 5, 10 | 2 |
| 15 | 3 | 2; 4, 5, 10 | 1 | 15 | 3 | 2, 3, 8, 9; 4, 5, 10 | 2 |
| 16 | 3 | 2, 3; 4, 5 | 1 | 16 | 3 | 2, 3, 8; 4, 5, 10, 11 | 2 |
| 17 | 3 | 2, 3, 8; 4 | 1 | 17 | 3 | 2, 3, 8, 9; 4, 5, 10, 11 | 2 |
| 18 | 3 | 0; 2 | 1 | 18 | 3 | 0, 1; 2, 3, 4 | 2 |
| 19 | 3 | 0; 2, 3 | 1 | 19 | 3 | 0, 1, 6; 2, 3 | 2 |
| 20 | 3 | 0, 1; 2 | 1 | 20 | 3 | 0, 1, 6; 2, 3, 4 | 2 |
| 21 | 3 | 0; 2, 3, 4 | 1 | 21 | 3 | 0, 1, 6; 2, 3, 4, 5 | 2 |
| 22 | 3 | 0, 1; 2, 3 | 1 | 22 | 3 | 0, 1, 6, 7; 2, 3, 4 | 2 |
| 23 | 3 | 0, 1, 6; 2 | 1 | 23 | 3 | 0, 1, 6, 7; 2, 3, 4, 5 | 2 |

TABLE 4-continued

Antenna port (1000 + a DMRS port number), a downlink DMRS configuration type parameter (DL-DMRS-config-type) = 2, and a downlink DMRS maximum length (DL-DMRS-max-len) = 2

| One codeword: Codeword 0 is enabled Codeword 1 is disabled | | | | Two codewords: Codeword 0 is enabled Codeword 1 is enabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 24 | 3 | 0; 2 | 1 | 24 | 3 | 0, 1; 2, 3, 8 | 2 |
| 25 | 3 | 0; 2, 3 | 1 | 25 | 3 | 0, 1, 4; 2, 3 | 2 |
| 26 | 3 | 0, 1; 2 | 1 | 26 | 3 | 0, 1, 4; 2, 3, 8 | 2 |
| 27 | 3 | 0; 2, 3, 8 | 1 | 27 | 3 | 0, 1, 4; 2, 3, 8, 9 | 2 |
| 28 | 3 | 0, 1; 2, 3 | 1 | 28 | 3 | 0, 1, 4, 5; 2, 3, 8 | 2 |
| 29 | 3 | 0, 1, 4; 2 | 1 | 29 | 3 | 0, 1, 4, 5; 2, 3, 8, 9 | 2 |
| 30 | 3 | 0; 4 | 1 | 30 | 3 | 0, 1; 4, 5, 10 | 2 |
| 31 | 3 | 0; 4, 5 | 1 | 31 | 3 | 0, 1, 2; 4, 5 | 2 |
| 32 | 3 | 0, 1; 4 | 1 | 32 | 3 | 0, 1, 2; 4, 5, 10 | 2 |
| 33 | 3 | 0; 4, 5, 10 | 1 | 33 | 3 | 0, 1, 2; 4, 5, 10, 11 | 2 |
| 34 | 3 | 0, 1; 4, 5 | 1 | 34 | 3 | 0, 1, 2, 3; 4, 5, 10 | 2 |
| 35 | 3 | 0, 1, 2; 4 | 1 | 35 | 3 | 0, 1, 2, 3; 4, 5, 10, 11 | 2 |
| 36-63 | Reserved | Reserved | Reserved | 36-63 | Reserved | Reserved | Reserved |

(2) MU-MIMO Scenario

To support MU-MIMO transmission, a network side device may schedule at least two terminal side devices on a same time-frequency resource. In this case, DMRSs sent to the at least two terminal sides are orthogonal or quasi-orthogonal.

A terminal side device 1 establishes a connection to a network side device, and receives a plurality of pieces of QCL information, the downlink DMRS configuration type parameter, and the downlink DMRS maximum length parameter that are configured by the network side device for the terminal side device 1 based on the RRC message. The terminal side device 2 establishes a connection with the network side device, and receives a plurality of pieces of QCL information configured by the network side device for the terminal side device 2 based on the RRC message. When determining to perform the NCJT transmission in an MU-MIMO scenario, the network side device sends downlink control information 1 to the terminal side device 1. The downlink control information 1 indicates at least two pieces of QCL information in the plurality of pieces of QCL information configured for the terminal side device 1, so that the terminal side device 1 learns that current transmission is the NCJT transmission. The terminal side device 1 determines a table for usage based on the downlink DMRS configuration type parameter and the downlink DMRS maximum length parameter that are configured for the terminal side device 1, and then determines, based on a specific value of indication information in the downlink control information 1, DMRS antenna ports on which the downlink data is scheduled. Similarly, the network side device further sends downlink control information 2 to the terminal side device 2. The downlink control information 2 indicates at least two pieces of QCL information in the plurality of pieces of QCL information configured for the terminal side device 2, so that the terminal side device 2 learns that current transmission is the NCJT transmission. The terminal side device 2 determines a table for usage based on the downlink DMRS configuration type parameter and the downlink DMRS maximum length parameter that are configured for the terminal side device 2, and then determines, based on a specific value of indication information in the downlink control information 2, DMRS antenna ports on which the downlink data is scheduled.

In the NCJT transmission mode, the network side device may enable, based on the downlink DMRS configuration type parameter and the downlink DMRS maximum length parameter, the terminal side device 1 and the terminal side device 2 to search for the required antenna ports by using a same table. In this case, the specific value of the indication information in the downlink control information 1 is different from the specific value of the indication information in the downlink control information 2, so that the terminal side device 1 and the terminal side device 2 use antenna ports corresponding to different rows in the same table.

In an example, for a same Table 5, the indication information in the downlink control information 1 is 0, and the DMRS antenna ports on which downlink data of the terminal side device 1 is located are {1000, 1002}. To enable the network side device to support MU-MIMO, the indication information in the downlink control information 2 is 1, and the DMRS ports on which downlink data of the terminal side device 2 is located are {1001, 1003}. The DMRS antenna ports {1000, 1001} are from a same CDM group, occupy same time-frequency resources, and are distinguished by using orthogonal codes. The DMRS antenna ports {1002, 1003} are from another same CDM group, occupy same time-frequency resources, and are distinguished by using orthogonal codes.

(2-1) The downlink DMRS configuration type parameter is equal to 1 (that is, there are two CDM groups), and there are two DMRS groups. Antenna ports included in a first CDM group in the two CDM groups are {1000, 1001, 1004, 1005}, and antenna ports included in a second CDM group are {1002, 1003, 1006, 1007}. The first DMRS group in the two DMRS groups includes at least one antenna port in the first CDM group, and the second DMRS group includes at least one antenna port in the second CDM group. In the case of transmission with one codeword, an absolute value of a difference between a quantity of layers of each antenna port included in the two DMRS groups is allowed to be greater than 1. In the case of two codewords, an absolute value of a difference between a quantity of layers of each antenna port included in the two DMRS groups is not greater than 1, a first codeword in the two codewords corresponds to the first DMRS group, and a second codeword in the two codewords corresponds to the second DMRS group.

(2-1a) If the downlink DMRS configuration type parameter is equal to 1, and the downlink DMRS maximum length parameter received by the terminal side device is equal to 1, the terminal side device determines, based on Table 5, the DMRS antenna ports on which a DMRS is currently transmitted (in this case, transmission with one codeword is supported).

(2-1b) If the downlink DMRS configuration type parameter is equal to 1, and the downlink DMRS maximum length parameter received by the terminal side device is equal to 2, the terminal side device determines, based on Table 6, the DMRS antenna ports on which a DMRS is currently transmitted.

TABLE 5

DMRS antenna port (1000 + a DMRS port number), a downlink DMRS configuration type (DL-DMRS-config-type) = 1, and a downlink DMRS maximum length (DL-DMRS-max-len) = 1
One codeword:
Codeword 0 is enabled (enabled)
Codeword 1 is disabled (disabled)

| Indication information (value) in downlink control information | Quantity of code division multiplexing CDM groups during rate matching | DMRS port number |
|---|---|---|
| 0 | 2 | 0; 2 |
| 1 | 2 | 1; 3 |
| 2 | 2 | 0; 2, 3 |
| 3 | 2 | 1; 6, 7 |
| 4 | 2 | 0, 1; 2 |
| 5 | 2 | 4, 5; 3 |
| 6 | 2 | 0; 2, 3, 6 |
| 7 | 2 | 0, 1; 2, 3 |
| 8 | 2 | 4, 5; 6, 7 |
| 9 | 2 | 0, 1, 4; 2 |
| 10-15 | Reserved | Reserved |

{1002, 1003, 1008, 1009}, and antenna ports included in a third CDM group are {1004, 1005, 1010, 1011}. In the case of transmission with one codeword, an absolute value of a difference between a quantity of layers of each antenna port included in the two DMRS groups is allowed to be greater than 1. In the case of two codewords, an absolute value of a difference between a quantity of layers of each antenna port included in the two DMRS groups is not greater than 1.

The two DMRS groups may have six selection manners: The first DMRS group includes at least one antenna port in the first CDM group, and the second DMRS group includes at least one antenna port in the second CDM group; The first DMRS group includes at least one antenna port in the first CDM group, and the second DMRS group includes at least one antenna port in the third CDM group; The first DMRS group includes at least one antenna port in the second CDM group, and the second DMRS group includes at least one antenna port in the third CDM group; The first DMRS group includes at least one antenna port in the first CDM group, and the second DMRS group includes at least one antenna port in the second CDM group and at least one antenna port in the third CDM group; The first DMRS group includes at least one antenna port in the first CDM group and at least one antenna port in the second CDM group, and the second DMRS group includes at least one antenna port in the third CDM group; The first DMRS group includes at least one antenna port in the first CDM group and at least one antenna port in the third CDM group, and the second DMRS group includes at least one antenna port in the second CDM group.

(2-2a) If the downlink DMRS configuration type parameter is equal to 2, and the downlink DMRS maximum length parameter received by the terminal side device is equal to 1, the terminal side device determines, based on Table 7, the DMRS antenna ports on which a DMRS is currently transmitted.

For example, the terminal side device learns, based on the at least two pieces of QCL information indicated by the TCI included in the downlink control information, that current

TABLE 6

DMRS antenna port (1000 + a DMRS port number), a downlink DMRS configuration type (DL-DMRS-config-type) = 1, and a downlink DMRS maximum length (DL-DMRS-max-len) = 2

| | One codeword: Codeword 0 is enabled Codeword 1 is disabled | | | | Two codewords: Codeword 0 is enabled Codeword 1 is enabled | | |
|---|---|---|---|---|---|---|---|
| Indication information (value) in downlink control information | Quantity of code division multiplexing CDM groups during rate matching | DMRS port number (DMRS ports) | Quantity of front-load symbols | Indication information (value) in downlink control information | Quantity of code division multiplexing CDM groups during rate matching | DMRS port number (DMRS ports) | Quantity of front-load symbols |
| 0 | 2 | 0; 2 | 1 | 0 | 2 | 0, 1; 2, 3, 6 | 2 |
| 1 | 2 | 1; 3 | 1 | 1 | 2 | 0, 1, 4; 2, 3 | 2 |
| 2 | 2 | 0; 2, 3 | 1 | 2 | 2 | 0, 1, 4; 2, 3, 6 | 2 |
| 3 | 2 | 1; 6, 7 | 1 | 3 | 2 | 0, 1, 4; 2, 3, 6, 7 | 2 |
| 4 | 2 | 0, 1; 2 | 1 | 4 | 2 | 0, 1, 4, 5; 2, 3, 6 | 2 |
| 5 | 2 | 4, 5; 3 | 1 | 5 | 2 | 0, 1, 4, 5; 2, 3, 6, 7 | 2 |
| 6 | 2 | 0; 2, 3, 6 | 1 | 6-7 | Reserved | Reserved | Reserved |
| 7 | 2 | 0, 1; 2, 3 | 1 | | | | |
| 8 | 2 | 4, 5; 6, 7 | 1 | | | | |
| 9 | 2 | 0, 1, 4; 2 | 1 | | | | |
| 10-15 | Reserved | Reserved | Reserved | | | | |

(2-2) The downlink DMRS configuration type parameter is equal to 2 (that is, there are three CDM groups), and there are still two DMRS groups. In this case, antenna ports included in a first CDM group are {1000, 1001, 1006, 1007}, antenna ports included in a second CDM group are transmission is the NCJT transmission. A value indicated by the downlink control information received by the terminal side device is 3, so that it can be learned from Table 7 that in the case of transmission with one codeword, the DMRS antenna ports on which the DMRS is currently transmitted are the port 1001 in the first DMRS group and the ports 1008 and 1009 in the second DMRS group, and in the case of transmission with two codewords, the DMRS antenna ports on which the DMRS is currently transmitted are the ports 1000, 1001, and 1006 in the first DMRS group and the ports 1002, 1003, 1008, and 1009 in the second DMRS group.

(2-2b) If the downlink DMRS configuration type parameter is equal to 2, and the downlink DMRS maximum length parameter received by the terminal side device is equal to 2, the terminal side device determines, based on Table 8, the DMRS antenna ports on which a DMRS is currently transmitted.

For example, the terminal side device learns, based on the at least two pieces of QCL information indicated by the TCI included in the downlink control information, that current transmission is the NCJT transmission. A value indicated by the downlink control information received by the terminal side is 5, so that it can be learned from Table 4 that in the case of transmission with one codeword, the DMRS antenna ports on which the DMRS is currently transmitted are the ports 1006 and 1007 in the first DMRS group and the port 1003 in the second DMRS group, and in the case of transmission with two codewords, the DMRS antenna ports on which the DMRS is currently transmitted are the ports 1000, 1001, 1006, and 1007 in the first DMRS group and the ports 1002, 1003, 1008, and 1009 in the second DMRS group.

TABLE 7

Antenna port (1000 + a DMRS port number), a downlink DMRS configuration type parameter (DL-DMRS-config-type) = 2, and a downlink DMRS maximum length (DL-DMRS-max-len) = 1

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 2 | 0 | 2 | 0, 1; 2, 3, 8 |
| 1 | 2 | 1; 3 | 1 | 2 | 0, 1, 6; 2, 3 |
| 2 | 2 | 0; 2, 3 | 2 | 2 | 0, 1, 6; 2, 3, 8 |
| 3 | 2 | 1; 8, 9 | 3 | 2 | 0, 1, 6; 2, 3, 8, 9 |
| 4 | 2 | 0, 1; 2 | 4 | 2 | 0, 1, 6, 7; 2, 3, 8 |
| 5 | 2 | 6, 7; 3 | 5 | 2 | 0, 1, 6, 7; 2, 3, 8, 9 |
| 6 | 2 | 0; 2, 3, 8 | 6 | 3 | 0, 1; 4, 5, 10 |
| 7 | 2 | 0, 1; 2, 3 | 7 | 3 | 0, 1, 6; 4, 5 |
| 8 | 2 | 6, 7; 8, 9 | 8 | 3 | 0, 1, 6; 4, 5, 10 |
| 9 | 2 | 0, 1, 6; 2 | 9 | 3 | 0, 1, 6; 4, 5, 10, 11 |
| 10 | 3 | 0; 4 | 10 | 3 | 0, 1, 6, 7; 4, 5, 10 |
| 11 | 3 | 1; 5 | 11 | 3 | 0, 1, 6, 7; 4, 5, 10, 11 |
| 12 | 3 | 0; 4, 5 | 12 | 3 | 2, 3; 4, 5, 10 |
| 13 | 3 | 1; 10, 11 | 13 | 3 | 2, 3, 8; 4, 5 |
| 14 | 3 | 0, 1; 4 | 14 | 3 | 2, 3, 8; 4, 5, 10 |
| 15 | 3 | 6, 7; 5 | 15 | 3 | 2, 3, 8, 9; 4, 5, 10 |
| 16 | 3 | 0; 4, 5, 10 | 16 | 3 | 2, 3, 8; 4, 5, 10, 11 |
| 17 | 3 | 0, 1; 4, 5 | 17 | 3 | 2, 3, 8, 9; 4, 5, 10, 11 |
| 18 | 3 | 6, 7; 10, 11 | 18 | 3 | 0, 1; 2, 3, 4 |
| 19 | 3 | 0, 1, 6; 4 | 19 | 3 | 6, 7; 5, 8, 9 |
| 20 | 3 | 2; 4 | 20 | 3 | 0, 1, 6; 2, 3 |
| 21 | 3 | 3; 5 | 21 | 3 | 0, 1, 6; 2, 3, 4 |
| 22 | 3 | 2; 4, 5 | 22 | 3 | 0, 1, 6; 2, 3, 4, 5 |

TABLE 7-continued

Antenna port (1000 + a DMRS port number), a downlink
DMRS configuration type parameter (DL-DMRS-config-type) = 2,
and a downlink DMRS maximum length (DL-DMRS-max-len) = 1

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 23 | 3 | 3; 10, 11 | 23 | 3 | 0, 1, 6, 7; 2, 3, 4 |
| 24 | 3 | 2, 3; 4 | 24 | 3 | 0, 1, 6, 7; 2, 3, 4, 5 |
| 25 | 3 | 8, 9; 5 | 25 | 3 | 0, 1; 2, 3, 8 |
| 26 | 3 | 2; 4, 5, 10 | 26 | 3 | 0, 1, 4; 2, 3 |
| 27 | 3 | 2, 3; 4, 5 | 27 | 3 | 5, 6, 7; 8, 9 |
| 28 | 3 | 8, 9; 10, 11 | 28 | 3 | 0, 1, 4; 2, 3, 8 |
| 29 | 3 | 2, 3, 8; 4 | 29 | 3 | 0, 1, 4; 2, 3, 8, 9 |
| 30 | 3 | 0; 2 | 30 | 3 | 0, 1, 4, 5; 2, 3, 8 |
| 31 | 3 | 1; 3 | 31 | 3 | 0, 1, 4, 5; 2, 3, 8, 9 |
| 32 | 3 | 0; 2, 3 | 32 | 3 | 0, 1; 4, 5, 10 |
| 33 | 3 | 1; 4, 5 | 33 | 3 | 0, 1, 2; 4, 5 |
| 34 | 3 | 0, 1; 2 | 34 | 3 | 3, 6, 7; 10, 11 |
| 35 | 3 | 6, 7; 3 | 35 | 3 | 0, 1, 2; 4, 5, 10 |
| 36 | 3 | 0; 2, 3, 4 | 36 | 3 | 0, 1, 2; 4, 5, 10, 11 |
| 37 | 3 | 1; 5, 8, 9 | 37 | 3 | 0, 1, 2, 3; 4, 5, 10 |
| 38 | 3 | 0, 1; 2, 3 | 38 | 3 | 0, 1, 2, 3; 4, 5, 10, 11 |
| 39 | 3 | 6, 7; 4, 5 | 39-63 | Reserved | Reserved |
| 40 | 3 | 0, 1, 6; 2 | | | |
| 41 | 3 | 0; 2 | | | |
| 42 | 3 | 1; 3 | | | |
| 43 | 3 | 0; 2, 3 | | | |
| 44 | 3 | 1; 8, 9 | | | |
| 45 | 3 | 0, 1; 2 | | | |
| 46 | 3 | 4, 5; 3 | | | |
| 47 | 3 | 0; 2, 3, 8 | | | |
| 48 | 3 | 0, 1; 2, 3 | | | |
| 49 | 3 | 4, 5; 8, 9 | | | |
| 50 | 3 | 0, 1, 4; 2 | | | |
| 51 | 3 | 5, 6, 7; 3 | | | |
| 52 | 3 | 0; 4 | | | |
| 53 | 3 | 1; 5 | | | |
| 54 | 3 | 0; 4, 5 | | | |
| 55 | 3 | 1; 10, 11 | | | |
| 56 | 3 | 0, 1; 4 | | | |
| 57 | 3 | 2, 3; 5 | | | |
| 58 | | 0; 4, 5, 10 | | | |
| 59 | 3 | 0, 1; 4, 5 | | | |
| 60 | 3 | 2, 3; 10, 11 | | | |
| 61 | 3 | 0, 1, 2; 4 | | | |
| 62 | 3 | 3, 6, 7; 5 | | | |
| 63 | Reserved | Reserved | | | |

TABLE 8

Antenna port (1000 + a DMRS port number), a downlink DMRS configuration type parameter
(DL-DMRS-config-type) = 2, and a downlink DMRS maximum length (DL-DMRS-max-len) = 2

| One codeword: Codeword 0 is enabled Codeword 1 is disabled | | | | Two codewords: Codeword 0 is enabled Codeword 1 is enabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 2 | 0; 2 | 1 | 0 | 2 | 0, 1; 2, 3, 8 | 2 |
| 1 | 2 | 1; 3 | 1 | 1 | 2 | 0, 1, 6; 2, 3 | 2 |
| 2 | 2 | 0; 2, 3 | 1 | 2 | 2 | 0, 1, 6; 2, 3, 8 | 2 |
| 3 | 2 | 1; 8, 9 | 1 | 3 | 2 | 0, 1, 6; 2, 3, 8, 9 | 2 |
| 4 | 2 | 0, 1; 2 | 1 | 4 | 2 | 0, 1, 6, 7; 2, 3, 8 | 2 |
| 5 | 2 | 6, 7; 3 | 1 | 5 | 2 | 0, 1, 6, 7; 2, 3, 8, 9 | 2 |
| 6 | 2 | 0; 2, 3, 8 | 1 | 6 | 3 | 0, 1; 4, 5, 10 | 2 |
| 7 | 2 | 0, 1; 2, 3 | 1 | 7 | 3 | 0, 1, 6; 4, 5 | 2 |
| 8 | 2 | 6, 7; 8, 9 | 1 | 8 | 3 | 0, 1, 6; 4, 5, 10 | 2 |
| 9 | 2 | 0, 1, 6; 2 | 1 | 9 | 3 | 0, 1, 6; 4, 5, 10, 11 | 2 |
| 10 | 3 | 0; 4 | 1 | 10 | 3 | 0, 1, 6, 7; 4, 5, 10 | 2 |
| 11 | 3 | 1; 5 | 1 | 11 | 3 | 0, 1, 6, 7; 4, 5, 10, 11 | 2 |
| 12 | 3 | 0; 4, 5 | 1 | 12 | 3 | 2, 3; 4, 5, 10 | 2 |
| 13 | 3 | 1; 10, 11 | 1 | 13 | 3 | 2, 3, 8; 4, 5 | 2 |
| 14 | 3 | 0, 1; 4 | 1 | 14 | 3 | 2, 3, 8; 4, 5, 10 | 2 |
| 15 | 3 | 6, 7; 5 | 1 | 15 | 3 | 2, 3, 8, 9; 4, 5, 10 | 2 |
| 16 | 3 | 0; 4, 5, 10 | 1 | 16 | 3 | 2, 3, 8; 4, 5, 10, 11 | 2 |
| 17 | 3 | 0, 1; 4, 5 | 1 | 17 | 3 | 2, 3, 8, 9; 4, 5, 10, 11 | 2 |
| 18 | 3 | 6, 7; 10, 11 | 1 | 18 | 3 | 0, 1; 2, 3, 4 | 2 |
| 19 | 3 | 0, 1, 6; 4 | 1 | 19 | 3 | 6, 7; 5, 8, 9 | 2 |
| 20 | 3 | 2; 4 | 1 | 20 | 3 | 0, 1, 6; 2, 3 | 2 |
| 21 | 3 | 3; 5 | 1 | 21 | 3 | 0, 1, 6; 2, 3, 4 | 2 |
| 22 | 3 | 2; 4, 5 | 1 | 22 | 3 | 0, 1, 6; 2, 3, 4, 5 | 2 |
| 23 | 3 | 3; 10, 11 | 1 | 23 | 3 | 0, 1, 6, 7; 2, 3, 4 | 2 |
| 24 | 3 | 2, 3; 4 | 1 | 24 | 3 | 0, 1, 6, 7; 2, 3, 4, 5 | 2 |
| 25 | 3 | 8, 9; 5 | 1 | 25 | 3 | 0, 1; 2, 3, 8 | 2 |
| 26 | 3 | 2; 4, 5, 10 | 1 | 26 | 3 | 0, 1, 4; 2, 3 | 2 |
| 27 | 3 | 2, 3; 4, 5 | 1 | 27 | 3 | 5, 6, 7; 8, 9 | 2 |
| 28 | 3 | 8, 9; 10, 11 | 1 | 28 | 3 | 0, 1, 4; 2, 3, 8 | 2 |
| 29 | 3 | 2, 3, 8; 4 | 1 | 29 | 3 | 0, 1, 4; 2, 3, 8, 9 | 2 |
| 30 | 3 | 0; 2 | 1 | 30 | 3 | 0, 1, 4, 5; 2, 3, 8 | 2 |
| 31 | 3 | 1; 3 | 1 | 31 | 3 | 0, 1, 4, 5; 2, 3, 8, 9 | 2 |
| 32 | 3 | 0; 2, 3 | 1 | 32 | 3 | 0, 1; 4, 5, 10 | 2 |
| 33 | 3 | 1; 4, 5 | 1 | 33 | 3 | 0, 1, 2; 4, 5 | 2 |
| 34 | 3 | 0, 1; 2 | 1 | 34 | 3 | 3, 6, 7; 10, 11 | 2 |
| 35 | 3 | 6, 7; 3 | 1 | 35 | 3 | 0, 1, 2; 4, 5, 10 | 2 |
| 36 | 3 | 0; 2, 3, 4 | 1 | 36 | 3 | 0, 1, 2; 4, 5, 10, 11 | 2 |
| 37 | 3 | 1; 5, 8, 9 | 1 | 37 | 3 | 0, 1, 2, 3; 4, 5, 10 | 2 |
| 38 | 3 | 0, 1; 2, 3 | 1 | 38 | 3 | 0, 1, 2, 3; 4, 5, 10, 11 | 2 |
| 39 | 3 | 6, 7; 4, 5 | 1 | 39-63 | Reserved | Reserved | Reserved |
| 40 | 3 | 0, 1, 6; 2 | 1 | | | | |
| 41 | 3 | 0; 2 | 1 | | | | |
| 42 | 3 | 1; 3 | 1 | | | | |
| 43 | 3 | 0; 2, 3 | 1 | | | | |
| 44 | 3 | 1; 8, 9 | 1 | | | | |
| 45 | 3 | 0, 1; 2 | 1 | | | | |
| 46 | 3 | 4, 5; 3 | 1 | | | | |
| 47 | 3 | 0; 2, 3, 8 | 1 | | | | |
| 48 | 3 | 0, 1; 2, 3 | 1 | | | | |
| 49 | 3 | 4, 5; 8, 9 | 1 | | | | |
| 50 | 3 | 0, 1, 4; 2 | 1 | | | | |
| 51 | 3 | 5, 6, 7; 3 | 1 | | | | |
| 52 | 3 | 0; 4 | 1 | | | | |
| 53 | 3 | 1; 5 | 1 | | | | |
| 54 | 3 | 0; 4, 5 | 1 | | | | |
| 55 | 3 | 1; 10, 11 | 1 | | | | |
| 56 | 3 | 0, 1; 4 | 1 | | | | |
| 57 | 3 | 2, 3; 5 | 1 | | | | |
| 58 | 3 | 0; 4, 5, 10 | 1 | | | | |
| 59 | 3 | 0, 1; 4, 5 | 1 | | | | |
| 60 | 3 | 2, 3; 10, 11 | 1 | | | | |
| 61 | 3 | 0, 1, 2; 4 | 1 | | | | |
| 62 | 3 | 3, 6, 7; 5 | 1 | | | | |
| 63 | Reserved | Reserved | Reserved | | | | |

By applying the technical solution provided in the first embodiment, the following bit usage analysis table may be obtained. It can be learned from the analysis table that, when the DMRS ports on which the downlink data is scheduled is determined by using different CDM combination manners that is of the two DMRS groups and that corresponds to the indication information in the downlink control information, the antenna ports can be accurately determined, and bit overheads are reduced in general. In addition, the technical solution provided in the first embodiment may be applied to the MU-MIMO, thereby improving scalability of the entire communications system.

|  |  |  | Quantity of bits used by indication information in downlink control information | |
|---|---|---|---|---|
|  |  |  | Prior art | Solution of a first embodiment |
| SU-MIMO | DL-DMRS-config-type = 1 | DL-DMRS-max-len = 1 | 4 | 3 |
|  |  | DL-DMRS-max-len = 2 | 6 |  |
|  | DL-DMRS-config-type = 2 | DL-DMRS-max-len = 1 | 5 | 6 |
|  |  | DL-DMRS-max-len = 2 | 6 |  |
| MU-MIMO | DL-DMRS-config-type = 1 | DL-DMRS-max-len = 1 | Not supported | 4 |
|  |  | DL-DMRS-max-len = 2 |  |  |
|  | DL-DMRS-config-type = 2 | DL-DMRS-max-len = 1 |  | 6 |
|  |  | DL-DMRS-max-len = 2 |  |  |

Based on the first embodiment, a second embodiment of this application provides an antenna port determining method. Antenna port group information is introduced, so that the terminal side device can determine, based on QCL information in downlink control information, indication information in the downlink control information, and the antenna port group information, the antenna port on which the downlink data is scheduled.

Figure 3:
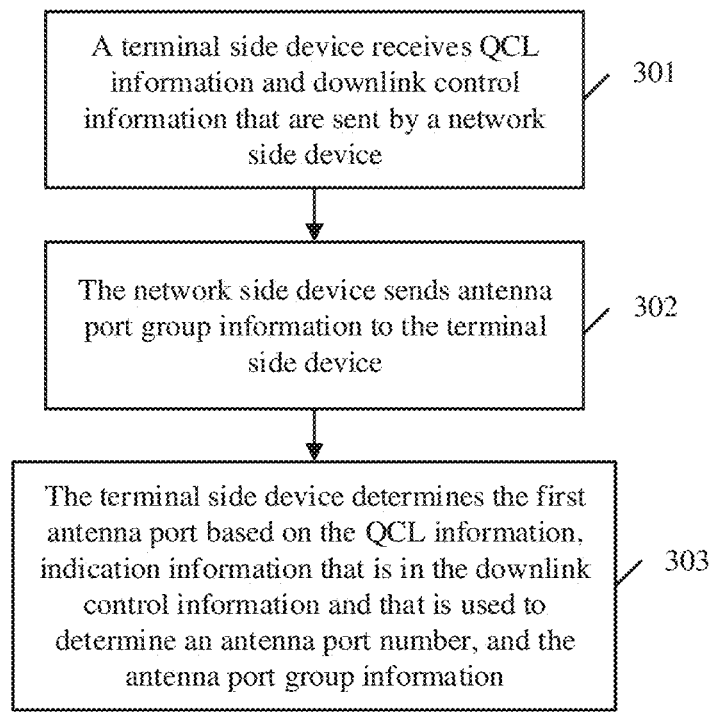
FIG. 3 is a schematic flowchart of an antenna port determining method according to an embodiment of this application.

FIG. 3 is a schematic flowchart of an antenna port determining method, including the following content.

301: The terminal side device receives downlink control information sent by a network side device, where the downlink control information includes the QCL information and the indication information that is used to determine an antenna port number of the first antenna port, and the QCL information indicates that there is a quasi-colocation QCL relationship between the first antenna port and a second antenna port.

The QCL information may specifically indicate that there is the QCL relationship between large-scale properties of the first antenna port and the second antenna port, so that the terminal side device can perform channel estimation based on the large-scale properties of the second antenna port, to further receive data sent by the network side device.

The QCL relationship includes four types, and may be configured based on a higher layer message (for example, an RRC message):

(1) QCL relationship type A: a Doppler frequency shift, a Doppler spread, an average delay, and a delay spread; (2) QCL relationship type B: a Doppler frequency shift and a Doppler spread; (3) QCL relationship type C: an average delay and a Doppler spread; (4) QCL relationship type D: spatial reception.

Optionally, the first antenna port is a DMRS antenna port, and the second antenna port is at least one of a channel state information reference signal (CSI-RS) antenna port, a synchronization signal block (SS block), a phase tracking reference signal antenna port, and a tracking reference signal (TRS) antenna port. According to a definition of QCL, when channel estimation is performed on a DMRS antenna port, a large-scale property of the DMRS antenna port may be inferred based on a large-scale property of at least one of a CSI-RS antenna port, a synchronization signal block, a phase tracking reference signal antenna port, and a tracking reference signal that have the QCL relationship (which may be specifically one of the foregoing four QCL relationship types) with the DMRS antenna port.

302: The network side device determines the antenna port group information, and sends the antenna port group information to the terminal side device, where the antenna port group information is used to determine at least one antenna port group.

There is a QCL relationship between antenna ports in each of the at least one antenna port group.

The at least two antenna port groups determined based on the antenna port group information include the first antenna port, and optionally, further include the second antenna port.

Optionally, the antenna port group information may be carried in a higher layer message (for example, the RRC message) and sent by the network side device to the terminal side device. For details, refer to the schematic diagram of information exchange shown in FIG. 2.

Optionally, if the antenna port group information includes an identifier of at least one CDM group or a port number of at least one DMRS antenna port, the at least one antenna port group determined based on the antenna port group information is the at least one DMRS group. To be specific, the terminal side device determines the at least one CDM group based on the identifier of the at least one CDM group, and then determines the at least one DMRS group based on the at least one CDM group. Alternatively, the terminal side device determines the at least one DMRS group based on the port number of the at least one DMRS antenna port. In this case, the terminal side device may pre-store an identifier of each CDM group or a port number of each DMRS antenna port.

Optionally, the antenna port group information may alternatively include the at least one CDM group or the at least one DMRS group. The terminal side device directly determines the at least one DMRS group directly based on the at least one CDM group. In this case, the terminal side device may not need to store the identifier of each CDM group.

Generally, a quantity of the CDM groups or the at least one DMRS antenna port indicated in the antenna port group information is at least two, and there are also at least two DMRS groups determined based on the antenna port group information.

When the antenna port group information includes identifiers of at least two CDM groups or the two CDM groups and two DMRS groups. A first DMRS group in the two DMRS groups includes at least one antenna port in at least one of the at least two CDM groups, and a second DMRS group in the two DMRS groups includes at least one antenna port in another CDM group in the two CDM groups.

Further, in a case of transmission with one codeword, an absolute value of a difference between a quantity of layers of the at least one antenna port included in the first DMRS group and a quantity of layers of the at least one antenna port included in the second DMRS group is greater than 1.

Further, in a case of transmission with two codewords, an absolute value of a difference between a quantity of layers of the at least one antenna port included in the first DMRS group and a quantity of layers of the at least one antenna port included in the second DMRS group is not greater than 1, a first codeword in the two codewords corresponds to the first DMRS group, and a second codeword corresponds to the second DMRS group.

303: The terminal side device determines the first antenna port based on the QCL information, the downlink control information, and the antenna port group information.

By using the first antenna port determined in 303, the terminal side device may further receive a reference signal on the first antenna port, to perform channel estimation and correctly receive data.

For ease of understanding, the following uses an example in which the first antenna port is a DMRS antenna port to describe possible implementations in 303 in different application scenarios. In these scenarios, in addition to the QCL information, the downlink control information, and the antenna port group information that are obtained from the network side device, the terminal side device may further receive a downlink DMRS configuration type parameter and a downlink DMRS maximum length parameter (DL-DMRS-max-len) from the network side device, to determine the DMRS antenna port on which a DMRS is currently transmitted.

A second embodiment of this application further provides an antenna port determining method. The method is based on the first embodiment, and further optimizes the tables in the SU-MIMO and MU-MIMO scenarios in the first embodiment. In the first embodiment, the quantities of bits of the downlink control information in the SU-MIMO scenario are 3 and 6, and the quantities of bits of the downlink control information in the MU-MIMO scenario are 4 and 6. In the second embodiment, the tables in the SU-MIMO and the MU-MIMO scenarios are split into a plurality of sub-tables, and a specific subtable for usage is determined based on the antenna port group information, thereby further reducing signaling overheads of the downlink control information.

(3) SU-MIMO Scenario

When the downlink DMRS configuration type is equal to 1, there are two CDM groups. In this case, Table 1 and Table 2 in the first embodiment are not split.

When the downlink DMRS configuration type is equal to 2, there are three CDM groups, and there are two DMRS groups. Antenna ports included in a first CDM group are {1000, 1001, 1006, 1007}, antenna ports included in a second CDM group are {1002, 1003, 1008, 1009}, and antenna ports included in a third CDM group are {1004, 1005, 1010, 1011}. The two DMRS groups may have six selection manners: The first DMRS group includes at least one antenna port in the first CDM group, and the second DMRS group includes at least one antenna port in the second CDM group; The first DMRS group includes at least one antenna port in the first CDM group, and the second DMRS group includes at least one antenna port in the third CDM group; The first DMRS group includes at least one antenna port in the second CDM group, and the second DMRS group includes at least one antenna port in the third CDM group; The first DMRS group includes at least one antenna port in the first CDM group, and the second DMRS group includes at least one antenna port in the second CDM group and at least one antenna port in the third CDM group; The first DMRS group includes at least one antenna port in the first CDM group and at least one antenna port in the second CDM group, and the second DMRS group includes at least one antenna port in the third CDM group; The first DMRS group includes at least one antenna port in the first CDM group and at least one antenna port in the third CDM group, and the second DMRS group includes at least one antenna port in the second CDM group.

Table 3 may be split into six subtables, as shown in Table 3-1 to Table 3-6. Table 4 may also be split into six subtables, as shown in Table 4-1 to Table 4-6. After the splitting, signaling overheads may be further reduced from six bits used by the indication information in the downlink control information in Table 3 and Table 4 to three bits.

The terminal side device establishes a connection to a network side device, and receives a plurality of pieces of QCL information configured by the network side device based on the RRC message. The terminal side device learns, based on the detected at least two pieces of QCL information (the at least two pieces of QCL information are included in the plurality of pieces of configured QCL information) indicated by TCI included in the downlink control information, that current transmission is NCJT transmission. If the RRC message received by the terminal side device further indicates the downlink DMRS configuration type parameter, the downlink DMRS maximum length parameter, and the antenna port group information, a subtable for usage is specifically determined. Then, the terminal side device determines, based on a specific value of the indication information in the downlink control information, DMRS antenna ports on which the downlink data is scheduled.

For example, when the downlink control information indicates the at least two pieces of QCL information, the terminal side device may determine that the current transmission is the NCJT transmission. The terminal side device then determines, based on the antenna port group information, that the first DMRS group includes at least one antenna port in the first CDM group, the second DMRS group includes at least one antenna port in the second CDM group, the downlink DMRS configuration type parameter (DL-DMRS-config-type) received from the higher layer message is equal to 2, and the downlink DMRS maximum length (DL-DMRS-max-len) received from the higher layer message is equal to 1. In this case, Table 3-1 is used. Then, DMRS ports corresponding to a row in Table 3-1 are determined based on the specific value of the indication information in the downlink control information. For example, when the specific value is 0, in the case of transmission with one codeword, the DMRS antenna ports on which the downlink data is scheduled are the port 1000 in the first DMRS group and the port 1002 in the second DMRS group.

TABLE 3-1

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 2 | 0 | 2 | 0, 1; 2, 3, 8 |
| 1 | 2 | 0; 2, 3 | 1 | 2 | 0, 1, 6; 2, 3 |
| 2 | 2 | 0, 1; 2 | 2 | 2 | 0, 1, 6; 2, 3, 8 |
| 3 | 2 | 0; 2, 3, 8 | 3 | 2 | 0, 1, 6; 2, 3, 8, 9 |
| 4 | 2 | 0, 1; 2, 3 | 4 | 2 | 0, 1, 6, 7; 2, 3, 8 |
| 5 | 2 | 0, 1, 6; 2 | 5 | 2 | 0, 1, 6, 7; 2, 3, 8, 9 |
| 6-7 | Reserved | Reserved | 6 | Reserved | Reserved |

TABLE 3-2

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 4 | 0 | 2 | 0, 1; 4, 5, 10 |
| 1 | 2 | 0; 4, 5 | 1 | 2 | 0, 1, 6; 4, 5 |
| 2 | 2 | 0, 1; 4 | 2 | 2 | 0, 1, 6; 4, 5, 10 |
| 3 | 2 | 0; 4, 5, 10 | 3 | 2 | 0, 1, 6; 4, 5, 10, 11 |
| 4 | 2 | 0, 1; 4, 5 | 4 | 2 | 0, 1, 6, 7; 4, 5, 10 |
| 5 | 2 | 0, 1, 6; 4 | 5 | 2 | 0, 1, 6, 7; 4, 5, 10, 11 |
| 6-7 | Reserved | Reserved | 6 | Reserved | Reserved |

TABLE 3-3

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a second CDM group, and a second DMRS group includes at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS antenna port number |
| 0 | 2 | 2; 4 | 0 | 2 | 2, 3; 4, 5, 10 |
| 1 | 2 | 2; 4, 5 | 1 | 2 | 2, 3, 8; 4, 5 |
| 2 | 2 | 2, 3; 4 | 2 | 2 | 2, 3, 8; 4, 5, 10 |
| 3 | 2 | 2; 4, 5, 10 | 3 | 2 | 2, 3, 8, 9; 4, 5, 10 |
| 4 | 2 | 2, 3; 4, 5 | 4 | 2 | 2, 3, 8; 4, 5, 10, 11 |
| 5 | 2 | 2, 3, 8; 4 | 5 | 2 | 2, 3, 8, 9; 4, 5, 10, 11 |
| 6-7 | Reserved | Reserved | 6 | Reserved | Reserved |

TABLE 3-4

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a second COM group and at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 2 | 0 | 2 | 0, 1; 2, 3, 4 |
| 1 | 2 | 0; 2, 3 | 1 | 2 | 0, 1, 6; 2, 3 |
| 2 | 2 | 0, 1; 3 | 2 | 2 | 0, 1, 6; 2, 3, 4 |
| 3 | 2 | 0; 2, 3, 4 | 3 | 2 | 0, 1, 6; 2, 3, 4, 5 |
| 4 | 2 | 0, 1; 2, 3 | 4 | 2 | 0, 1, 6, 7; 2, 3, 4 |
| 5 | 2 | 0, 1, 6; 2 | 5 | 2 | 0, 1, 6, 7; 2, 3, 4, 5 |
| 6-7 | Reserved | Reserved | 6 | Reserved | Reserved |

TABLE 3-5

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group and at least one antenna port in a third CDM group, and a second DMRS group includes at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 2 | 0 | 2 | 0, 1; 2, 3, 8 |
| 1 | 2 | 0; 2, 3 | 1 | 2 | 0, 1, 4; 2, 3 |
| 2 | 2 | 0, 1; 2 | 2 | 2 | 0, 1, 4; 2, 3, 8 |
| 3 | 2 | 0; 2, 3, 8 | 3 | 2 | 0, 1, 4; 2, 3, 8, 9 |
| 4 | 2 | 0, 1; 2, 3 | 4 | 2 | 0, 1, 4, 5; 2, 3, 8 |
| 5 | 2 | 0, 1, 4; 2 | 5 | 2 | 0, 1, 4, 5; 2, 3, 8, 9 |
| 6-7 | Reserved | Reserved | 6 | Reserved | Reserved |

TABLE 3-6

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group and at least one antenna port in a second CDM group, and a second DMRS group includes at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 1 | 0; 4 | 0 | 2 | 0, 1; 4, 5, 10 |
| 1 | 1 | 0; 4, 5 | 1 | 2 | 0, 1, 2; 4, 5 |
| 2 | 1 | 0, 1; 4 | 2 | 2 | 0, 1, 2; 4, 5, 10 |
| 3 | 2 | 0; 4, 5, 10 | 3 | 2 | 0, 1, 2; 4, 5, 10, 11 |
| 4 | 2 | 0, 1; 4, 5 | 4 | 2 | 0, 1, 2, 3; 4, 5, 10 |
| 5 | 2 | 0, 1, 2; 4 | 5 | 2 | 0, 1, 2, 3; 4, 5, 10, 11 |
| 6-7 | Reserved | Reserved | 6 | Reserved | Reserved |

TABLE 4-1

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group, and a second DMRS group includes at least one antenna port in a second CDM group (the information may be directly indicated in an RRC message)

| One codeword: Codeword 0 is enabled Codeword 1 is disabled | | | | Two codewords: Codeword 0 is enabled Codeword 1 is disabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 2 | 0; 2 | 2 | 0 | 2 | 0, 1; 2, 3, 8 | 2 |
| 1 | 2 | 0; 2, 3 | 2 | 1 | 2 | 0, 1, 6; 2, 3 | 2 |
| 2 | 2 | 0, 1; 2 | 2 | 2 | 2 | 0, 1, 6; 2, 3, 8 | 2 |
| 3 | 2 | 0; 2, 3, 8 | 2 | 3 | 2 | 0, 1, 6; 2, 3, 8, 9 | 2 |
| 4 | 2 | 0, 1; 2, 3 | 2 | 4 | 2 | 0, 1, 6, 7; 2, 3, 8 | 2 |
| 5 | 2 | 0, 1, 6; 2 | 2 | 5 | 2 | 0, 1, 6, 7; 2, 3, 8, 9 | 2 |
| 6-7 | Reserved | Reserved | Reserved | 6 | Reserved | Reserved | Reserved |

TABLE 4-2

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group, and a second DMRS group includes at least one antenna port in a third CDM group (the information may be directly indicated in an RRC message)

| One codeword: Codeword 0 is enabled Codeword 1 is disabled | | | | One codeword: Codeword 0 is enabled Codeword 1 is disabled | | | |
|---|---|---|---|---|---|---|---|
| Indication information (value) in downlink control information | Quantity of code division multiplexing CDM groups during rate matching | DMRS antenna port number (DMRS ports) | Quantity of front-load symbols | Indication information (value) in downlink control information | Quantity of code division multiplexing CDM groups during rate matching | DMRS antenna port number (DMRS ports) | Quantity of front-load symbols |
| 0 | 2 | 0; 4 | 2 | 0 | 2 | 0, 1; 4, 5, 10 | 2 |
| 1 | 2 | 0; 4, 5 | 2 | 1 | 2 | 0, 1, 6; 4, 5 | 2 |
| 2 | 2 | 0, 1; 4 | 2 | 2 | 2 | 0, 1, 6; 4, 5, 10 | 2 |
| 3 | 2 | 0; 4, 5, 10 | 2 | 3 | 2 | 0, 1, 6; 4, 5, 10, 11 | 2 |
| 4 | 2 | 0, 1; 4, 5 | 2 | 4 | 2 | 0, 1, 6, 7; 4, 5, 10 | 2 |
| 5 | 2 | 0, 1, 6; 4 | 2 | 5 | 2 | 0, 1, 6, 7; 4, 5, 10, 11 | 2 |
| 6-7 | Reserved | Reserved | Reserved | 6 | Reserved | Reserved | Reserved |

TABLE 4-3

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a second CDM group, and a second DMRS group includes at least one antenna port in a third CDM group (the information may be directly indicated in an RRC message)

| One codeword: Codeword 0 is enabled Codeword 1 is disabled | | | | Two codewords: Codeword 0 is enabled Codeword 1 is disabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 2 | 2; 4 | 2 | 0 | 2 | 2, 3; 4, 5, 10 | 2 |
| 1 | 2 | 2; 4, 5 | 2 | 1 | 2 | 2, 3, 8; 4, 5 | 2 |
| 2 | 2 | 2, 3; 4 | 2 | 2 | 2 | 2, 3, 8; 4, 5, 10 | 2 |
| 3 | 2 | 2; 4, 5, 10 | 2 | 3 | 2 | 2, 3, 8, 9; 4, 5, 10 | 2 |
| 4 | 2 | 2, 3; 4, 5 | 2 | 4 | 2 | 2, 3, 8; 4, 5, 10, 11 | 2 |
| 5 | 2 | 2, 3, 8; 4 | 2 | 5 | 2 | 2, 3, 8, 9; 4, 5, 10, 11 | 2 |
| 6-7 | Reserved | Reserved | Reserved | 6 | Reserved | Reserved | Reserved |

TABLE 4-4

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group, and a second DMRS group includes at least one antenna port in a second CDM group and at least one antenna port group in a third CDM group (the information may be directly indicated in an RRC message)

| One codeword: Codeword 0 is enabled Codeword 1 is disabled | | | | Two codewords: Codeword 0 is enabled Codeword 1 is disabled | | | |
|---|---|---|---|---|---|---|---|
| Indication information (value) in downlink control information | Quantity of code division multiplexing CDM groups during rate matching | DMRS antenna port number | Quantity of front-load symbols | Indication information (value) in downlink control information | Quantity of code division multiplexing CDM groups during rate matching | DMRS port number | Quantity of front-load symbols |
| 0 | 2 | 0; 2 | 1 | 0 | 2 | 0, 1; 2, 3, 4 | 2 |
| 1 | 2 | 0; 2, 3 | 1 | 1 | 2 | 0, 1, 6; 2, 3 | 2 |
| 2 | 2 | 0, 1; 3 | 1 | 2 | 2 | 0, 1, 6; 2, 3, 4 | 2 |
| 3 | 2 | 0; 2, 3, 4 | 1 | 3 | 2 | 0, 1, 6; 2, 3, 4, 5 | 2 |
| 4 | 2 | 0, 1; 2, 3 | 1 | 4 | 2 | 0, 1, 6, 7; 2, 3, 4 | 2 |
| 5 | 2 | 0, 1, 6; 2 | 1 | 5 | 2 | 0, 1, 6, 7; 2, 3, 4, 5 | 2 |
| 6-7 | Reserved | Reserved | Reserved | 6 | Reserved | Reserved | Reserved |

TABLE 4-5

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group, at least one antenna port in a third CDM group, and a second DMRS group includes at least one antenna port in a second CDM group (the information may be directly indicated in an RRC message)

| One codeword: Codeword 0 is enabled Codeword 1 is disabled | | | | Two codewords: Codeword 0 is enabled Codeword 1 is disabled | | | |
|---|---|---|---|---|---|---|---|
| Indication information (value) in downlink control information | Quantity of code division multiplexing CDM groups during rate matching | DMRS antenna port number (DMRS ports) | Quantity of front-load symbols | Indication information (value) in downlink control information | Quantity of code division multiplexing CDM groups during rate matching | DMRS antenna port number (DMRS ports) | Quantity of front-load symbols |
| 0 | 2 | 0; 2 | 2 | 0 | 2 | 0, 1; 2, 3, 8 | 2 |
| 1 | 2 | 0; 2, 3 | 2 | 1 | 2 | 0, 1, 4; 2, 3 | 2 |
| 2 | 2 | 0, 1; 2 | 2 | 2 | 2 | 0, 1, 4; 2, 3, 8 | 2 |
| 3 | 2 | 0; 2, 3, 8 | 2 | 3 | 2 | 0, 1, 4; 2, 3, 8, 9 | 2 |
| 4 | 2 | 0, 1; 2, 3 | 2 | 4 | 2 | 0, 1, 4, 5; 2, 3, 8 | 2 |
| 5 | 2 | 0, 1, 4; 2 | 2 | 5 | 2 | 0, 1, 4, 5; 2, 3, 8, 9 | 2 |
| 6-7 | Reserved | Reserved | Reserved | 6 | Reserved | Reserved | Reserved |

TABLE 4-6

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group and at least one antenna port in a second CDM group, and a second DMRS group indudes at least one antenna port in a third CDM group (the information may be directly indicated in an RRC message)

| One codeword: Codeword 0 is enabled Codeword 1 is disabled | | | | Two codewords: Codeword 0 is enabled Codeword 1 is disabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 1 | 0; 4 | 1 | 0 | 2 | 0, 1; 4, 5, 10 | 2 |
| 1 | 1 | 0; 4, 5 | 1 | 1 | 2 | 0, 1, 2; 4, 5 | 2 |
| 2 | 1 | 0, 1; 4 | 1 | 2 | 2 | 0, 1, 2; 4, 5, 10 | 2 |
| 3 | 2 | 0; 4, 5, 10 | 1 | 3 | 2 | 0, 1, 2; 4, 5, 10, 11 | 2 |
| 4 | 2 | 0, 1; 4, 5 | 1 | 4 | 2 | 0, 1, 2, 3; 4, 5, 10 | 2 |
| 5 | 2 | 0, 1, 2; 4 | 1 | 5 | 2 | 0, 1, 2, 3; 4, 5, 10, 11 | 2 |
| 6-7 | Reserved | Reserved | Reserved | 6 | Reserved | Reserved | Reserved |

(4) MU-MIMO Scenario

To support MU-MIMO transmission, a network side device may schedule at least two terminal side devices on a same time-frequency resource. In this case, DMRSs sent to the at least two terminal sides are orthogonal or quasi-orthogonal.

When the downlink DMRS configuration type is equal to 1, there are two CDM groups. In this case, Table 5 and Table 6 in the first embodiment are not split.

When the downlink DMRS configuration type is equal to 2, there are three CDM groups, and there are two DMRS groups. Antenna ports included in a first CDM group are {1000, 1001, 1006, 1007}, antenna ports included in a second CDM group are {1002, 1003, 1008, 1009}, and antenna ports included in a third CDM group are {1004, 1005, 1010, 1011}. The two DMRS groups may have six selection manners: The first DMRS group includes at least one antenna port in the first CDM group, and the second DMRS group includes at least one antenna port in the second CDM group; The first DMRS group includes at least one antenna port in the first CDM group, and the second DMRS group includes at least one antenna port in the third CDM group; The first DMRS group includes at least one antenna port in the second CDM group, and the second DMRS group includes at least one antenna port in the third CDM group; The first DMRS group includes at least one antenna port in the first CDM group, and the second DMRS group includes at least one antenna port in the second CDM group and at least one antenna port in the third CDM group; The first DMRS group includes at least one antenna port in the first CDM group and at least one antenna port in the second CDM group, and the second DMRS group includes at least one antenna port in the third CDM group; The first DMRS group includes at least one antenna port in the first CDM group and at least one antenna port in the third CDM group, and the second DMRS group includes at least one antenna port in the second CDM group.

Table 7 may be split into six subtables, as shown in Table 7-1 to Table 7-6. Table 8 may also be split into six subtables, as shown in Table 8-1 to Table 8-6. After the splitting, signaling overheads may be further reduced from six bits used by the indication information in the downlink control information in Table 7 and Table 8 to four bits.

In an example, a terminal side device 1 establishes a connection to a network side device, and receives a plurality of pieces of QCL information, the downlink DMRS configuration type parameter, the downlink DMRS maximum length parameter, and the antenna port group information that are configured by the network side device for the terminal side device 1 based on the RRC message. The terminal side device 2 establishes a connection to the network side device, and receives a plurality of pieces of QCL information configured by the network side device for the terminal side device 2 based on the RRC message. When determining to perform NCJT transmission in an MU-MIMO scenario, the network side device sends downlink control information 1 to the terminal side device 1. The downlink control information 1 indicates at least two pieces of QCL information in the plurality of pieces of QCL information configured for the terminal side device 1, so that the terminal side device 1 learns that current transmission is the NCJT transmission. The terminal side device 1 determines a subtable for usage based on the downlink DMRS configuration type parameter, the downlink DMRS maximum length parameter, and the antenna port group information that are configured for the terminal side device 1, and then determines, based on a specific value of indication information in the downlink control information 1 in the subtable, DMRS antenna ports on which the downlink data is scheduled. Similarly, the network side device further sends downlink control information 2 to the terminal side device 2. The downlink control information 2 indicates at least two pieces of QCL information in the plurality of pieces of QCL information configured for the terminal side device 2, so that the terminal side device 2 learns that current transmission is the NCJT transmission. The terminal side device 2 determines a subtable for usage based on the downlink DMRS configuration type parameter, the downlink DMRS maximum length parameter, and the antenna port group information that are configured for the terminal side device 2, and then determines, based on a specific value of indication information in the downlink control information 2 in the subtable, DMRS antenna ports on which the downlink data is scheduled.

In the NCJT transmission mode, the network side device may enable, based on the downlink DMRS configuration type parameter and the downlink DMRS maximum length parameter, the terminal side device 1 and the terminal side device 2 to search for the required antenna ports by using a same table. In this case, the specific value of the indication information in the downlink control information 1 is different from the specific value of the indication information in the downlink control information 2, so that the terminal side device 1 and the terminal side device 2 use antenna ports corresponding to different rows in the same table.

TABLE 7-1

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
| --- | --- | --- | --- | --- | --- |
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 2 | 0; 2 | 0 | 2 | 0, 1; 2, 3, 8 |
| 1 | 2 | 1; 3 | 1 | 2 | 0, 1, 6; 2, 3 |

TABLE 7-1-continued

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 2 | 2 | 0; 2, 3 | 2 | 2 | 0, 1, 6; 2, 3, 8 |
| 3 | 2 | 1; 8, 9 | 3 | 2 | 0, 1, 6; 2, 3, 8, 9 |
| 4 | 2 | 0, 1; 2 | 4 | 2 | 0, 1, 6, 7; 2, 3, 8 |
| 5 | 2 | 6, 7; 3 | 5 | 2 | 0, 1, 6, 7; 2, 3, 8, 9 |
| 6 | 2 | 0; 2, 3, 8 | 6-15 | Reserved | Reserved |
| 7 | 2 | 0, 1; 2, 3 | | | |
| 8 | 2 | 6, 7; 8, 9 | | | |
| 9 | 2 | 0, 1, 6; 2 | | | |
| 10-15 | Reserved | Reserved | | | |

TABLE 7-2

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group, and a second DMRS group includes at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 3 | 0; 4 | 0 | 3 | 0, 1; 4, 5, 10 |
| 1 | 3 | 1; 5 | 1 | 3 | 0, 1, 6; 4, 5 |
| 2 | 3 | 0; 4, 5 | 2 | 3 | 0, 1, 6; 4, 5, 10 |
| 3 | 3 | 1; 10, 11 | 3 | 3 | 0, 1, 6; 4, 5, 10, 11 |
| 4 | 3 | 0, 1; 4 | 4 | 3 | 0, 1, 6, 7; 4, 5, 10 |
| 5 | 3 | 6, 7; 5 | 5 | 3 | 0, 1, 6, 7; 4, 5, 10, 11 |
| 6 | 3 | 0; 4, 5, 10 | 6-15 | Reserved | Reserved |
| 7 | 3 | 0, 1; 4, 5 | | | |
| 8 | 3 | 6, 7; 10, 11 | | | |
| 9 | 3 | 0, 1, 6; 4 | | | |
| 10-15 | Reserved | Reserved | | | |

TABLE 7-3

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a second CDM group, and a second DMRS group includes at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
| --- | --- | --- | --- | --- | --- |
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 3 | 2; 4 | 0 | 3 | 2, 3; 4, 5, 10 |
| 1 | 3 | 3; 5 | 1 | 3 | 2, 3, 8; 4, 5 |
| 2 | 3 | 2; 4, 5 | 2 | 3 | 2, 3, 8; 4, 5, 10 |
| 3 | 3 | 3; 10, 11 | 3 | 3 | 2, 3, 8, 9; 4, 5, 10 |
| 4 | 3 | 2, 3; 4 | 4 | 3 | 2, 3, 8; 4, 5, 10, 11 |
| 5 | 3 | 8, 9; 5 | 5 | 3 | 2, 3, 8, 9; 4, 5, 10, 11 |
| 6 | 3 | 2; 4, 5, 10 | 6-15 | Reserved | Reserved |
| 7 | 3 | 2, 3; 4, 5 | | | |
| 8 | 3 | 8, 9; 10, 11 | | | |
| 9 | 3 | 2, 3, 8; 4 | | | |
| 10-15 | Reserved | Reserved | | | |

TABLE 7-4

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a first CDM group and at least one antenna port in a second CDM group, and a second DMRS group includes at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
| --- | --- | --- | --- | --- | --- |
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 3 | 0; 2 | 0 | 3 | 0, 1; 2, 3, 4 |
| 1 | 3 | 1; 3 | 1 | 3 | 6, 7; 5, 8, 9 |
| 2 | 3 | 0; 2, 3 | 2 | 3 | 0, 1, 6; 2, 3 |
| 3 | 3 | 1; 4, 5 | 3 | 3 | 0, 1, 6; 2, 3, 4 |
| 4 | 3 | 0, 1; 2 | 4 | 3 | 0, 1, 6; 2, 3, 4, 5 |
| 5 | 3 | 6, 7; 3 | 5 | 3 | 0, 1, 6, 7; 2, 3, 4 |
| 6 | 3 | 0; 2, 3, 4 | 6 | 3 | 0, 1, 6, 7; 2, 3, 4, 5 |
| 7 | 3 | 1; 5, 8, 9 | 7-15 | Reserved | Reserved |
| 8 | 3 | 0, 1; 2, 3 | | | |
| 9 | 3 | 6, 7; 4, 5 | | | |
| 10 | 3 | 0, 1, 6; 2 | | | |
| 11-15 | Reserved | Reserved | | | |

TABLE 7-5

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a second CDM group, and a second DMRS group includes at least one antenna port in a first CDM group and at least one antenna port in a third CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS port number | Indication information (value) in downlink control information | Quantity of code division multiplexing CDM groups during rate matching | DMRS port number |
| 0 | 3 | 0; 2 | 0 | 3 | 0, 1; 2, 3, 8 |
| 1 | 3 | 1; 3 | 1 | 3 | 0, 1, 4; 2, 3 |
| 2 | 3 | 0; 2, 3 | 2 | 3 | 5, 6, 7; 8, 9 |
| 3 | 3 | 1; 8, 9 | 3 | 3 | 0, 1, 4; 2, 3, 8 |
| 4 | 3 | 0, 1; 2 | 4 | 3 | 0, 1, 4; 2, 3, 8, 9 |
| 5 | 3 | 4, 5; 3 | 5 | 3 | 0, 1, 4, 5; 2, 3, 8 |
| 6 | 3 | 0; 2, 3, 8 | 6 | 3 | 0, 1, 4, 5; 2, 3, 8, 9 |
| 7 | 3 | 0, 1; 2, 3 | 7-15 | Reserved | Reserved |
| 8 | 3 | 4, 5; 8, 9 | | | |
| 9 | | 0, 1, 4; 2 | | | |
| 10 | 3 | 5, 6, 7; 3 | | | |
| 11-15 | Reserved | Reserved | | | |

TABLE 7-6

Antenna port (1000 + a DMRS port number), a downlink DMRS configuration type parameter (DL-DMRS-config-type) = 2, a downlink DMRS maximum length (DL-DMRS-max-len) = 1, and a first DMRS group determined based on antenna port group information includes at least one antenna port in a third CDM group, and a second DMRS group includes at least one antenna port in a first CDM group and at least one antenna port in a second CDM group (the information may be directly indicated in an RRC message)

| One codeword: Codeword 0 is enabled Codeword 1 is disabled | | | Two codewords: Codeword 0 is enabled Codeword 1 is enabled | | |
|---|---|---|---|---|---|
| Indication information (value) in downlink control information | Quantity of code division multiplexing CDM groups during rate matching | DMRS antenna port number (DMRS ports) | Indication information (value) in downlink control information | Quantity of code division multiplexing CDM groups during rate matching | DMRS antenna port number (DMRS ports) |
| 0 | 3 | 0; 4 | 0 | 3 | 0, 1; 4, 5, 10 |
| 1 | 3 | 1; 5 | 1 | 3 | 0, 1, 2; 4, 5 |
| 2 | 3 | 0; 4, 5 | 2 | 3 | 3, 6, 7; 10, 11 |
| 3 | 3 | 1; 10, 11 | 3 | 3 | 0, 1, 2; 4, 5, 10 |
| 4 | 3 | 0, 1; 4 | 4 | 3 | 0, 1, 2; 4, 5, 10, 11 |
| 5 | 3 | 2, 3; 5 | 5 | 3 | 0, 1, 2, 3; 4, 5, 10 |
| 6 | 3 | 0; 4, 5, 10 | 6 | 3 | 0, 1, 2, 3; 4, 5, 10, 11 |
| 7 | | 0, 1; 4, 5 | 7-15 | Reserved | Reserved |
| 8 | 3 | 2, 3; 10, 11 | | | |
| 9 | 3 | 0, 1, 2; 4 | | | |
| 10 | 3 | 3, 6, 7; 5 | | | |
| 11-15 | Reserved | Reserved | | | |

TABLE 8-1

Antenna port (1000 + a DMRS port number), a downlink DMRS configuration type parameter (DL-DMRS-config-type) = 2,
a downlink DMRS maximum length (DL-DMRS-max-len) = 2, and a first DMRS group determined based on antenna port group information
includes at least one antenna port in a first CDM group, and a second DMRS group includes at least one antenna port in a second CDM group
(the information may be directly indicated in an RRC message)

| | One codeword:<br>Codeword 0 is enabled<br>Codeword 1 is disabled | | | | Two codewords:<br>Codeword 0 is enabled<br>Codeword 1 is enabled | | |
| --- | --- | --- | --- | --- | --- | --- | --- |
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 2 | 0; 2 | 1 | 0 | 2 | 0, 1; 2, 3, 8 | 2 |
| 1 | 2 | 1; 3 | 1 | 1 | 2 | 0, 1, 6; 2, 3 | 2 |
| 2 | 2 | 0; 2, 3 | 1 | 2 | 2 | 0, 1, 6; 2, 3, 8 | 2 |
| 3 | 2 | 1; 8, 9 | 1 | 3 | 2 | 0, 1, 6; 2, 3, 8, 9 | 2 |
| 4 | 2 | 0, 1; 2 | 1 | 4 | 2 | 0, 1, 6, 7; 2, 3, 8 | 2 |
| 5 | 2 | 6, 7; 3 | 1 | 5 | 2 | 0, 1, 6, 7; 2, 3, 8, 9 | 2 |
| 6 | 2 | 0; 2, 3, 8 | 1 | 6-15 | Reserved | Reserved | Reserved |
| 7 | 2 | 0, 1; 2, 3 | 1 | | | | |
| 8 | 2 | 6, 7; 8, 9 | 1 | | | | |
| 9 | 2 | 0, 1, 6; 2 | 1 | | | | |
| 10-15 | Reserved | Reserved | Reserved | | | | |

TABLE 8-2

Antenna port (1000 + a DMRS port number), a downlink DMRS configuration type parameter (DL-DMRS-config-type) = 2,
a downlink DMRS maximum length (DL-DMRS-max-len) = 2, and a first DMRS group determined based on antenna port group information
includes at least one antenna port in a first CDM group, and a second DMRS group includes at least one antenna port in a third CDM group
(the information may be directly indicated in an RRC message)

| | One codeword:<br>Codeword 0 is enabled<br>Codeword 1 is disabled | | | | Two codewords:<br>Codeword 0 is enabled<br>Codeword 1 is enabled | | |
| --- | --- | --- | --- | --- | --- | --- | --- |
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 3 | 0; 4 | 1 | 0 | 3 | 0, 1; 4, 5, 10 | 2 |
| 1 | 3 | 1; 5 | 1 | 1 | 3 | 0, 1, 6; 4, 5 | 2 |
| 2 | 3 | 0; 4, 5 | 1 | 2 | 3 | 0, 1, 6; 4, 5, 10 | 2 |
| 3 | 3 | 1; 10, 11 | 1 | 3 | 3 | 0, 1, 6; 4, 5, 10, 11 | 2 |
| 4 | 3 | 0, 1; 4 | 1 | 4 | 3 | 0, 1, 6, 7; 4, 5, 10 | 2 |
| 5 | 3 | 6, 7; 5 | 1 | 5 | 3 | 0, 1, 6, 7; 4, 5, 10, 11 | 2 |
| 6 | 3 | 0; 4, 5, 10 | 1 | 6-15 | Reserved | Reserved | Reserved |
| 7 | 3 | 0, 1; 4, 5 | 1 | | | | |
| 8 | 3 | 6, 7; 10, 11 | 1 | | | | |
| 9 | 3 | 0, 1, 6; 4 | 1 | | | | |
| 10-15 | Reserved | Reserved | Reserved | | | | |

TABLE 8-3

Antenna port (1000 + a DMRS port number), a downlink DMRS configuration type parameter (DL-DMRS-config-type) = 2,
a downlink DMRS maximum length (DL-DMRS-max-len) = 2, and a first DMRS group determined based on antenna port group information
includes at least one antenna port in a second CDM group, and a second DMRS group includes at least one antenna port in a third CDM group
(the information may be directly indicated in an RRC message)

| | One codeword:<br>Codeword 0 is enabled<br>Codeword 1 is disabled | | | | Two codewords:<br>Codeword 0 is enabled<br>Codeword 1 is enabled | | |
| --- | --- | --- | --- | --- | --- | --- | --- |
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 3 | 2; 4 | 1 | 0 | 3 | 2, 3; 4, 5, 10 | 2 |
| 1 | 3 | 3; 5 | 1 | 1 | 3 | 2, 3, 8; 4, 5 | 2 |

TABLE 8-3-continued

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a second CDM group, and a second DMRS group includes at least one antenna port in a third CDM group (the information may be directly indicated in an RRC message)

| | One codeword: Codeword 0 is enabled Codeword 1 is disabled | | | | Two codewords: Codeword 0 is enabled Codeword 1 is enabled | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 2 | 3 | 2; 4, 5 | 1 | 2 | 3 | 2, 3, 8; 4, 5, 10 | 2 |
| 3 | 3 | 3; 10, 11 | 1 | 3 | 3 | 2, 3, 8, 9; 4, 5, 10 | 2 |
| 4 | 3 | 2, 3; 4 | 1 | 4 | 3 | 2, 3, 8; 4, 5, 10, 11 | 2 |
| 5 | 3 | 8, 9; 5 | 1 | 5 | 3 | 2, 3, 8, 9; 4, 5, 10, 11 | 2 |
| 6 | 3 | 2; 4, 5, 10 | 1 | 6-15 | Reserved | Reserved | Reserved |
| 7 | 3 | 2, 3; 4, 5 | 1 | | | | |
| 8 | 3 | 8, 9; 10, 11 | 1 | | | | |
| 9 | 3 | 2, 3, 8; 4 | 1 | | | | |
| 10-15 | Reserved | Reserved | Reserved | | | | |

TABLE 8-4

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a first CDM group, and a second DMRS group includes at least one antenna port in a second CDM group and at least one antenna port in a third CDM group (the information may be directly indicated in an RRC message)

| | One codeword: Codeword 0 is enabled Codeword 1 is disabled | | | | Two codewords: Codeword 0 is enabled Codeword 1 is enabled | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 3 | 0; 2 | 1 | 0 | 3 | 0, 1; 2, 3, 4 | 2 |
| 1 | 3 | 1; 3 | 1 | 1 | 3 | 6, 7; 5, 8, 9 | 2 |
| 2 | 3 | 0; 2, 3 | 1 | 2 | 3 | 0, 1, 6; 2, 3 | 2 |
| 3 | 3 | 1; 4, 5 | 1 | 3 | 3 | 0, 1, 6; 2, 3, 4 | 2 |
| 4 | 3 | 0, 1; 2 | 1 | 4 | 3 | 0, 1, 6; 2, 3, 4, 5 | 2 |
| 5 | 3 | 6, 7; 3 | 1 | 5 | 3 | 0, 1, 6, 7; 2, 3, 4 | 2 |
| 6 | 3 | 0; 2, 3, 4 | 1 | 6 | 3 | 0, 1, 6, 7; 2, 3, 4, 5 | 2 |
| 7 | 3 | 1; 5, 8, 9 | 1 | 7-15 | Reserved | Reserved | Reserved |
| 8 | 3 | 0, 1; 2, 3 | 1 | | | | |
| 9 | 3 | 6, 7; 4, 5 | 1 | | | | |
| 10 | 3 | 0, 1, 6; 2 | 1 | | | | |
| 11-15 | Reserved | Reserved | Reserved | | | | |

TABLE 8-5

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a second DM group, and a second DMRS group includes at least one antenna port in a first CDM group and at least one antenna port in a third CDM group (the information may be directly indicated in an RRC message)

| | One codeword: Codeword 0 is enabled Codeword 1 is disabled | | | | Two codewords: Codeword 0 is enabled Codeword 1 is enabled | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 3 | 0; 2 | 1 | 0 | 3 | 0, 1; 2, 3, 8 | 2 |
| 1 | 3 | 1; 3 | 1 | 1 | 3 | 0, 1, 4; 2, 3 | 2 |
| 2 | 3 | 0; 2, 3 | 1 | 2 | 3 | 5, 6, 7; 8, 9 | 2 |

TABLE 8-5-continued

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based on antenna port group information includes at least one antenna port in a second DM group, and a second DMRS group includes at least one antenna port in a first CDM group and at least one antenna port in a third CDM group (the information may be directly indicated in an RRC message)

| One codeword: Codeword 0 is enabled Codeword 1 is disabled | | | | Two codewords: Codeword 0 is enabled Codeword 1 is enabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 3 | 3 | 1; 8, 9 | 1 | 3 | 3 | 0, 1, 4; 2, 3, 8 | 2 |
| 4 | 3 | 0, 1; 2 | 1 | 4 | 3 | 0, 1, 4; 2, 3, 8, 9 | 2 |
| 5 | 3 | 4, 5; 3 | 1 | 5 | 3 | 0, 1, 4, 5; 2, 3, 8 | 2 |
| 6 | 3 | 0; 2, 3, 8 | 1 | 6 | 3 | 0, 1, 4, 5; 2, 3, 8, 9 | 2 |
| 7 | 3 | 0, 1; 2, 3 | 1 | 7-15 | Reserved | Reserved | Reserved |
| 8 | 3 | 4, 5; 8, 9 | 1 | | | | |
| 9 | 3 | 0, 1, 4; 2 | 1 | | | | |
| 10 | 3 | 5, 6, 7; 3 | 1 | | | | |
| 11-15 | Reserved | Reserved | Reserved | | | | |

TABLE 8-6

Antenna port (1000 + a DMRS port number), a downlink DMRS configuration type parameter (DL-DMRS-config-type) = 2, a downlink DMRS maximum length (DL-DMRS-max-len) = 2, and a first DMRS group determined based oh antenna port group information includes at least one antenna port in a third CDM group, and a second DMRS group includes at least one antenna port in a first CDM group and at least one antenna port in a second CDM group (the information may be directly indicated in an RRC message)

| One codeword: Codeword 0 is enabled Codeword 1 is disabled | | | | Two codewords: Codeword 0 is enabled Codeword 1 is enabled | | | |
|---|---|---|---|---|---|---|---|
| Indication information (value) in downlink control information | Quantity of code division multiplexing CDM groups during rate matching | DMRS port number | Quantity of front-load symbols | Indication information (value) in downlink control information | Quantity of code division multiplexing CDM groups during rate matching | DMRS port number | Quantity of front-load symbols |
| 0 | 3 | 0; 4 | 1 | 0 | 3 | 0, 1; 4, 5, 10 | 2 |
| 1 | 3 | 1; 5 | 1 | 1 | 3 | 0, 1, 2; 4, 5 | 2 |
| 2 | 3 | 0; 4, 5 | 1 | 2 | 3 | 3, 6, 7; 10, 11 | 2 |
| 3 | 3 | 1; 10, 11 | 1 | 3 | 3 | 0, 1, 2; 4, 5, 10 | 2 |
| 4 | 3 | 0, 1; 4 | 1 | 4 | 3 | 0, 1, 2; 4, 5, 10, 11 | 2 |
| 5 | 3 | 2, 3; 5 | 1 | 5 | 3 | 0, 1, 2, 3; 4, 5, 10 | 2 |
| 6 | 3 | 0; 4, 5, 10 | 1 | 6 | 3 | 0, 1, 2, 3; 4, 5, 10, 11 | 2 |
| 7 | 3 | 0, 1; 4, 5 | 1 | 7-15 | Reserved | Reserved | Reserved |
| 8 | 3 | 2, 3; 10, 11 | 1 | | | | |
| 9 | 3 | 0, 1, 2; 4 | 1 | | | | |
| 10 | 3 | 3, 6, 7; 5 | 1 | | | | |
| 11-15 | Reserved | Reserved | Reserved | | | | |

By applying the technical solution provided in the second embodiment, the following bit usage analysis table may be obtained. It can be learned from the analysis table that the terminal side device further determines, based on the received antenna port group information and different antenna port groups, the DMRS ports on which the downlink data is scheduled, to further reduce signaling overheads.

| | | | Quantity of bits used by indication information in downlink control information | | |
|---|---|---|---|---|---|
| | | | Prior art | First embodiment | Second embodiment |
| SU-MIMO | DL-DMRS-config-type = 1 | DL-DMRS-max-len = 1 | 4 | 3 | 3 |
| | | DL-DMRS-max-len = 2 | 6 | | |
| | DL-DMRS-config-type = 2 | DL-DMRS-max-len = 1 | 5 | 6 | 3 |
| | | DL-DMRS-max-len = 2 | 6 | | |

-continued

|  |  |  | Quantity of bits used by indication information in downlink control information | | |
|---|---|---|---|---|---|
|  |  |  | Prior art | First embodiment | Second embodiment |
| MU-MIMO | DL-DMRS-config-type = 1 | DL-DMRS-max-len = 1 DL-DMRS-max-len = 2 | Not supported | 4 | 4 |
|  | DL-DMRS-config-type = 2 | DL-DMRS-max-len = 1 DL-DMRS-max-len = 2 |  | 6 | 4 |

Figure 4:
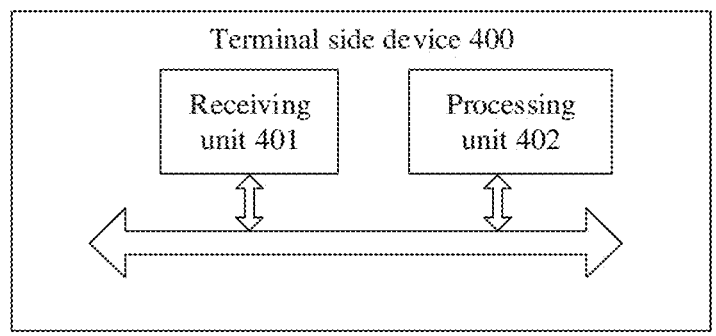
FIG. 4 is a schematic diagram of a unit structure of a terminal side device according to an embodiment of this application.

A third embodiment of this application provides a terminal side device 400. FIG. 4 is a schematic structural diagram of the terminal side device. The terminal side device 400 includes a receiving unit 401 and a processing unit 402.

The terminal side device 400 provided in the third embodiment of this application may be the terminal side device in the first embodiment or the second embodiment, and performs the method performed by the terminal side device. Specifically, the receiving unit 401 is configured to perform a receiving action of the terminal side device in the first embodiment or the second embodiment, and the processing unit 402 is configured to perform processing actions such as determining of the terminal side device in the first embodiment or the second embodiment. For details, refer to content described in the first embodiment or the second embodiment.

Figure 5:
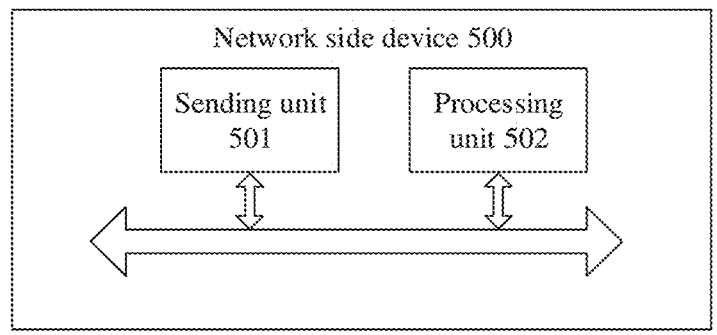
FIG. 5 is a schematic diagram of a unit structure of a network side device according to an embodiment of this application.

A third embodiment of this application further provides a network side device 500. FIG. 5 is a schematic structural diagram of the network side device. The network side device 500 includes a sending unit 501 and a processing unit 502. The network side device 500 may be the network side device in the first embodiment or the second embodiment, and performs the method performed by the network side device. Specifically, the sending unit 501 is configured to perform a sending action of the network side device in the first embodiment or the second embodiment, and the processing unit 502 is configured to perform processing actions such as determining of the network side device in the first embodiment or the second embodiment. For details, refer to content described in the first embodiment or the second embodiment.

Figure 6:
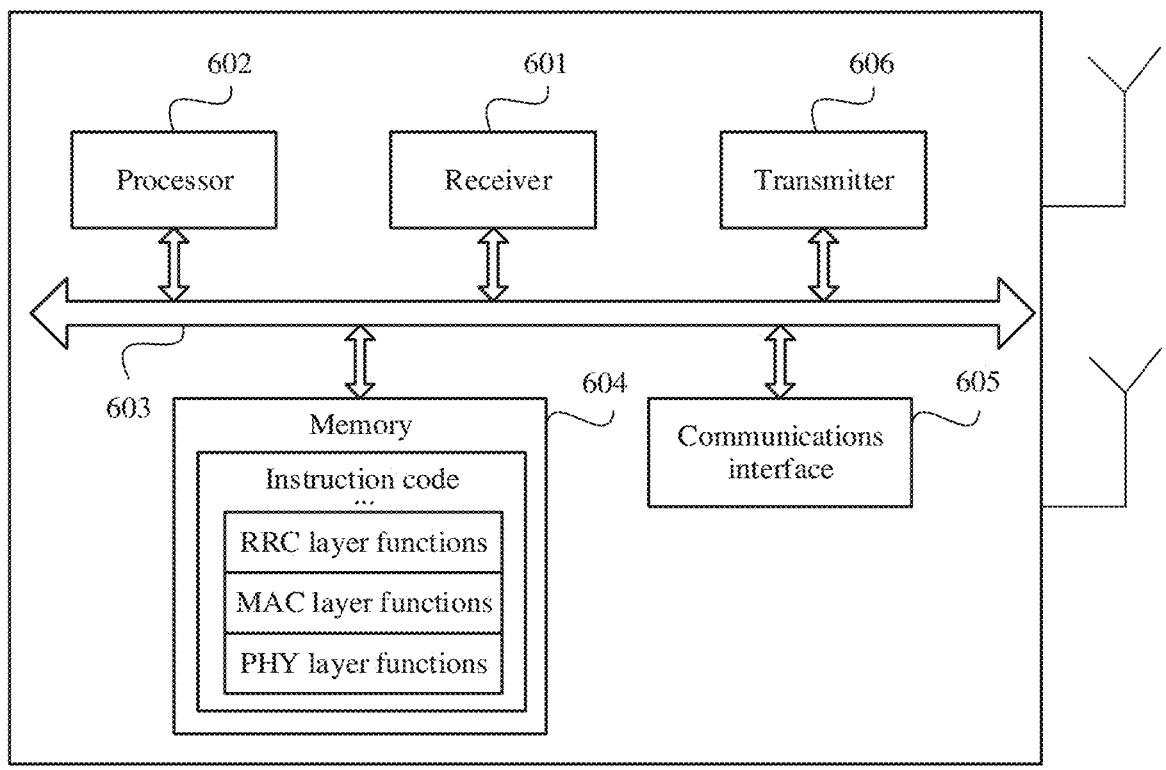
FIG. 6 is a schematic diagram of another hardware structure of a terminal side device or a network side device according to an embodiment of this application.

In specific hardware implementation, FIG. 6 is a schematic diagram of a general-purpose hardware structure of a terminal side device and the network side device. A function of a receiving unit may be specifically implemented by a receiver 601, a function of a processing unit may be specifically implemented by a processor 602, and a function of a sending unit may be specifically implemented by a transmitter 606. The hardware structure may further include various electronic circuits, for example, a bus 603, a memory 604, and a communications interface 605. The memory 604 may include instruction code. When the instruction code is invoked by the processor 602, the instruction code is used to implement a function of the terminal side device in the first embodiment or the second embodiment. The instruction code may include code used for RRC layer functions, code used for MAC layer functions, and code used for PHY layer functions. Optionally, the memory 604 may be integrated into the processor 602, or may be independent of the processor 602.

The communications interface 605 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface.

The bus may be a peripheral component interconnect (PCI) standard bus, an extended industry standard architecture (EISA) bus, or the like. The bus may be classified into an address bus, a data bus, a control bus, and the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the apparatus (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a processor of a general-purpose computer, a special-purpose computer, an embedded processor, or another programmable data processing device to generate a machine, so that the instructions executed by the processor of the computer or the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more procedures in the flowcharts and/or in one or more blocks in the block diagrams.

What is claimed is:

1. An antenna port determining method, performed by a terminal side device, the method comprising:
receiving downlink control information, wherein the downlink control information comprises quasi-colocation (QCL) information and indication information wherein the indication information is used by the terminal side device to determine an antenna port number of a first antenna port on which downlink data is scheduled, and the QCL information indicates that there is a QCL relationship between the first antenna port and a second antenna port;
receiving antenna port group information, wherein the antenna port group information is used by the terminal side device to determine at least one antenna port group, and the at least one antenna port group comprises the first antenna port; and
determining the first antenna port based on the QCL information, the indication information, and the antenna port group information.

2. The antenna port determining method according to claim 1, wherein the antenna port group information comprises an identifier of at least one code division multiplexing (CDM) group or at least one demodulation reference signal (DMRS) antenna port number, the at least one antenna port group is at least one DMRS group, and there is a QCL relationship between antenna ports in each of the at least one antenna port group.

3. The antenna port determining method according to claim 2, wherein
there are at least two CDM groups and two DMRS groups, a first DMRS group in the two DMRS groups comprises at least one antenna port in at least one of the at least two CDM groups, and a second DMRS group in the two DMRS groups comprises at least one antenna port in another CDM group in the two CDM groups.

4. The antenna port determining method according to claim 3, wherein in a case of transmission with one codeword,
an absolute value of a difference between a quantity of layers of the at least one antenna port comprised in the first DMRS group and a quantity of layers of the at least one antenna port comprised in the second DMRS group is allowed to be greater than 1.

5. The antenna port determining method according to claim 3, wherein in a case of transmission with two codewords,
an absolute value of a difference between a quantity of layers of the at least one antenna port comprised in the first DMRS group and a quantity of layers of the at least one antenna port comprised in the second DMRS group is not greater than 1, a first codeword in the two codewords corresponds to the first DMRS group, and a second codeword corresponds to the second DMRS group.

6. A terminal side device, comprising a memory having program instructions and a processor, wherein the program instructions are executed by the processor to cause the terminal side device to perform operations comprising:
receiving downlink control information, wherein the downlink control information comprises quasi-colocation (QCL) information and indication information, and wherein the indication information is used to determine an antenna port number of a first antenna port on which downlink data is scheduled, and the QCL information indicates that there is a QCL relationship between the first antenna port and a second antenna port;
receiving antenna port group information, wherein the antenna port group information is used to determine at least one antenna port group, and the at least one antenna port group comprises the first antenna port; and
determining the first antenna port based on the QCL information, the indication information, and the antenna port group information.

7. The terminal side device according to claim 6, wherein the antenna port group information comprises an identifier of at least one code division multiplexing (CDM) group or at least one demodulation reference signal (DMRS) antenna port number, the at least one antenna port group is at least one DMRS group, and there is a QCL relationship between antenna ports in each of the at least one antenna port group.

8. The terminal side device according to claim 7, wherein
there are at least two CDM groups and two DMRS groups, a first DMRS group in the two DMRS groups comprises at least one antenna port in at least one of the at least two CDM groups, and a second DMRS group in the two DMRS groups comprises at least one antenna port in another CDM group in the two CDM groups.

9. The terminal side device according to claim 8, wherein in a case of transmission with one codeword,
an absolute value of a difference between a quantity of layers of the at least one antenna port comprised in the first DMRS group and a quantity of layers of the at least one antenna port comprised in the second DMRS group is allowed to be greater than 1.

10. The terminal side device according to claim 8, wherein in a case of transmission with two codewords,
an absolute value of a difference between a quantity of layers of the at least one antenna port comprised in the first DMRS group and a quantity of layers of the at least one antenna port comprised in the second DMRS group is not greater than 1, a first codeword in the two codewords corresponds to the first DMRS group, and a second codeword corresponds to the second DMRS group.

11. An antenna port determining method, performed by a network side device, the method comprising:
sending downlink control information, wherein the downlink control information comprises quasi-colocation (QCL) information and indication information, wherein the indication information provides for determining an antenna port number of a first antenna port on which downlink data is scheduled, and the QCL information indicates that there is a QCL relationship between the first antenna port and a second antenna port; and
sending antenna port group information, wherein the antenna port group information provides for determining at least one antenna port group, the at least one antenna port group comprises the first antenna port, and the QCL information, the indication information, and the antenna port group information provide for determining the first antenna port.

12. The antenna port determining method according to claim 11, wherein the antenna port group information comprises an identifier of at least one code division multiplexing (CDM) group or at least one demodulation reference signal (DMRS) antenna port number, the at least one antenna port group is the at least one DMRS group, and there is a QCL relationship between antenna ports in each of the at least one antenna port group.

13. The antenna port determining method according to claim 12, wherein there are at least two CDM groups and two DMRS groups, a first DMRS group in the two DMRS groups comprises at least one antenna port in at least one of the at least two CDM groups, and a second DMRS group in the two DMRS groups comprises at least one antenna port in another CDM group in the two CDM groups.

14. The antenna port determining method according to claim 13, wherein in a case of transmission with one codeword, an absolute value of a difference between a quantity of layers of the at least one antenna port comprised in the first DMRS group and a quantity of layers of the at least one antenna port comprised in the second DMRS group is allowed to be greater than 1.

15. The antenna port determining method according to claim 13, wherein in a case of transmission with two codewords, an absolute value of a difference between a quantity of layers of the at least one antenna port comprised in the first DMRS group and a quantity of layers of the at least one antenna port comprised in the second DMRS group is not greater than 1, a first codeword in the two codewords corresponds to the first DMRS group, and a second codeword corresponds to the second DMRS group.

16. A network side device, comprising a memory having program instructions and a processor; wherein the program instructions are executed by the processor to cause the network side device to:
   determine quasi-colocation (QCL) information, indication information that provides for determining an antenna port number of a first antenna port on which downlink data is scheduled, and antenna port group information, wherein the QCL information indicates that there is a QCL relationship between a first antenna port and a second antenna port, the antenna port group information provides for determining at least one antenna port group, and the at least one antenna port group comprises the first antenna port; and
   send downlink control information and the antenna port group information, wherein the downlink control information comprises the QCL information and the indication information, and the QCL information, the indication information, and the antenna port group information are provide for determining the first antenna port.

17. The network side device according to claim 16, wherein the antenna port group information comprises an identifier of at least one code division multiplexing (CDM) group or at least one demodulation reference signal (DMRS) antenna port number, the at least one antenna port group is the at least one DMRS group, and there is a QCL relationship between antenna ports in each of the at least one antenna port group.

18. The network side device according to claim 17, wherein there are at least two CDM groups and two DMRS groups, a first DMRS group in the two DMRS groups comprises at least one antenna port in at least one of the at least two CDM groups, and a second DMRS group in the two DMRS groups comprises at least one antenna port in another CDM group in the two CDM groups.

19. The network side device according to claim 18, wherein in a case of transmission with one codeword, an absolute value of a difference between a quantity of layers of the at least one antenna port comprised in the first DMRS group and a quantity of layers of the at least one antenna port comprised in the second DMRS group is allowed to be greater than 1.

20. The network side device according to claim 18, wherein in a case of transmission with two codewords, an absolute value of a difference between a quantity of layers of the at least one antenna port comprised in the first DMRS group and a quantity of layers of the at least one antenna port comprised in the second DMRS group is not greater than 1, a first codeword in the two codewords corresponds to the first DMRS group, and a second codeword corresponds to the second DMRS group.

* * * * *